United States Patent
Ito et al.

(10) Patent No.: US 8,352,975 B2
(45) Date of Patent: Jan. 8, 2013

(54) CHUCKING DEVICE WITH A CONE INCLUDING A SLIDING PORTION, BRUSHLESS MOTOR USING THE SAME, AND DISK DRIVE APPARATUS USING THE SAME

(75) Inventors: Haruhiko Ito, Kyoto (JP); Toshihide Sonoda, Kyoto (JP); Daisuke Tsunashima, Kyoto (JP); Takuya Yamane, Kyoto (JP); Shigeo Kawamura, Kyoto (JP); Yoshihisa Kitamura, Kyoto (JP); Hisakazu Motomochi, Kyoko (JP)

(73) Assignee: Nidec Corporation, Kyoto (JP)

( * ) Notice: Subject to any disclaimer, the term of this patent is extended or adjusted under 35 U.S.C. 154(b) by 177 days.

(21) Appl. No.: 12/908,385

(22) Filed: Oct. 20, 2010

(65) Prior Publication Data

US 2011/0035764 A1 Feb. 10, 2011

Related U.S. Application Data

(63) Continuation-in-part of application No. 12/201,638, filed on Aug. 29, 2008, now Pat. No. 7,979,873.

(30) Foreign Application Priority Data

Aug. 31, 2007 (JP) .................................. 2007-225196
Nov. 6, 2009 (JP) .................................. 2009-254839

(51) Int. Cl.
G11B 17/028 (2006.01)
(52) U.S. Cl. ........................................ 720/704; 720/710
(58) Field of Classification Search .......... 720/703–704, 720/706–707, 710
See application file for complete search history.

(56) References Cited

U.S. PATENT DOCUMENTS

| 5,166,920 | A | * | 11/1992 | Kogure ........................ 720/707 |
| 5,774,445 | A | * | 6/1998 | Sawi et al. .................... 720/707 |
| 6,072,767 | A | | 6/2000 | Iwazawa |
| 6,208,613 | B1 | * | 3/2001 | Iizuka ........................ 720/707 |
| 6,347,070 | B1 | * | 2/2002 | Fahey et al. .................. 720/706 |
| 6,363,048 | B1 | * | 3/2002 | Wu et al. ...................... 720/707 |
| 6,611,490 | B1 | * | 8/2003 | Bierhoff ...................... 720/707 |
| 6,826,771 | B1 | * | 11/2004 | Wada .......................... 720/707 |
| 7,036,135 | B2 | * | 4/2006 | Hsu et al. ..................... 720/707 |
| 7,181,752 | B2 | * | 2/2007 | Shinkai et al. ................ 720/707 |
| 7,802,272 | B2 | * | 9/2010 | Kanzawa et al. .............. 720/707 |
| 2004/0216154 | A1 | * | 10/2004 | Kim et al. .................... 720/707 |
| 2007/0028255 | A1 | | 2/2007 | Ito et al. |
| 2007/0143773 | A1 | * | 6/2007 | Park et al. .................... 720/706 |
| 2007/0294712 | A1 | * | 12/2007 | Ito et al. ...................... 720/702 |

FOREIGN PATENT DOCUMENTS

JP 09-035383 A 2/1997

(Continued)

*Primary Examiner* — Brian Miller
(74) *Attorney, Agent, or Firm* — Westerman, Hattori, Daniels & Adrian, LLP

(57) ABSTRACT

A chucking device includes a turntable fixed to a shaft having a central axis and a cone arranged axially above the turntable. An annular yoke is arranged above a sliding portion of the cone and fixed to the shaft, and a clamp magnet is fixed to the yoke through an adhesive agent. The yoke includes an upper surface having an annular recess defined in a concentric relationship with the central axis, the adhesive agent being applied on a region of the upper surface existing radially inwards of the recess. The recess includes a radial outer wall parallel to the central axis and a radial inner wall inclined radially inwards and axially upwards. The angle between the radial outer wall and a lower surface of the clamp magnet is greater than the angle between the radial inner wall and the lower surface of the clamp magnet.

18 Claims, 25 Drawing Sheets

FOREIGN PATENT DOCUMENTS

| | | |
|---|---|---|
| JP | 09-198757 A | 7/1997 |
| JP | 10-199081 A | 7/1998 |
| JP | 2002-148134 A | 5/2002 |
| JP | 2003-036584 A | 2/2003 |
| JP | 2003-217201 A | 7/2003 |
| JP | 2004-234773 A | 8/2004 |
| JP | 2007-059040 A | 3/2007 |

* cited by examiner

CHUCKING DEVICE WITH A CONE INCLUDING A SLIDING PORTION, BRUSHLESS MOTOR USING THE SAME, AND DISK DRIVE APPARATUS USING THE SAME

CROSS REFERENCE TO RELATED APPLICATION

This application is a Continuation-In-Part Application of U.S. patent application Ser. No. 12/201,638 filed on Sep. 15, 2008.

BACKGROUND OF THE INVENTION

1. Field of the Invention

The present invention relates to a chucking device for removably holding a disk, a brushless motor provided with the chucking device and a disk drive apparatus equipped with the brushless motor. More particularly, the present invention pertains to a chucking device capable of accurately aligning the center of a central opening of a disk with the center of the chucking device.

2. Description of the Related Art

In recent years, the rotational speeds of a disk and a brushless motor for rotating the disk are increased as the operation of recording and reproducing the disk such as a CD, a DVD or the like becomes faster. At the present time, it is sometimes the case that the brushless motor is rotated at a speed of about 12,000 rpm. This brushless motor may suffer from vibration if a disk rotates with the center thereof misaligned with the center of the motor. As a chucking device that copes with the high speed rotation of the disk, there has been employed a structure that includes a cone having an annular slanting surface arranged to make contact with the entire extension of an inner circumferential surface of a central opening of the disk. The cone is movable along the axis of a shaft serving as a rotating shaft. Furthermore, the cone is axially upwardly biased by a resilient member such as a coil spring or the like (see, e.g., Japanese Patent Application Publication No. 2004-234773 for the structure of such a conventional chucking device).

As a disk drive apparatus becomes cheaper, there is an increasing demand for price reduction of the brushless motor with which the disk drive apparatus is equipped.

However, the conventional chucking device with the cone requires the use of an additional clamp member that presses the upper surface of the disk to keep the same in place. In addition, a resilient member such as a coil spring or the like is required in the conventional chucking device, which increases the number of parts of the chucking device. As a result, it becomes difficult to reduce the price of the chucking device, which in turn makes it difficult to achieve price reduction of the brushless motor provided with the chucking device.

Meanwhile, Japanese Patent Application Publication No. 2009-59410 discloses a chucking device including a cone, an annular yoke made of a magnetic material and a substantially annular clamp magnet. An annular recess is defined on the upper surface of the yoke. The yoke is arranged axially above the cone and fixed to a shaft. The clamp magnet is fixed to the upper surface of the yoke by an adhesive agent.

The adhesive agent is applied on a radially inward region of the recess when attaching the clamp magnet to the yoke. Thus, the adhesive agent is received within the recess as it spreads radially outwards. This prevents the adhesive agent from being pushed out of the yoke.

In the course of attaching the clamp magnet to the yoke, the clamp magnet is strongly pressed against the yoke by a magnetic attraction force acting between the clamp magnet and the yoke. When the adhesive agent is not uniformly applied on the upper surface of the yoke, there is a fear that the adhesive agent may be oozed out from between the yoke and the clamp magnet. When first fixing the yoke to the shaft and then bonding the clamp magnet to the yoke, the adhesive agent thus oozed may adhere to between the yoke and the cone and between the clamp magnet and the cone. This impedes movement of the cone. When first bonding the clamp magnet to the yoke and then fixing the yoke to the shaft, it would be possible to wipe out the oozed adhesive agent. However, the task of wiping out the adhesive agent is not easy to perform.

SUMMARY OF THE INVENTION

In view of the above, it is an object of the present invention to reliably prevent an adhesive agent from being oozed out from between a yoke and a clamp magnet.

In accordance with one aspect of the present invention, there is provided a chucking device for removably holding a disk with a central opening, including: a shaft coaxially arranged with a specified central axis; a turntable fixed to the shaft, the turntable including a disk support surface arranged to support the disk; a cone arranged axially above the turntable, the cone including a sliding portion arranged to make axial sliding movement with respect to the shaft and a disk holding portion having an annular disk holding surface inclined radially outwards and axially downwards; an annular yoke arranged above the sliding portion of the cone and fixed to the shaft; and a clamp magnet fixed to the yoke through an adhesive agent; wherein the yoke includes an upper surface having an annular recess defined in a concentric relationship with the central axis, at least a part of the adhesive agent being applied on a region of the upper surface existing radially inwards of the first recess; the recess includes a radial outer wall parallel to the central axis or inclined radially outwards and axially upwards, and a radial inner wall inclined radially inwards and axially upwards; and the angle between the radial outer wall and the central axis is smaller than the angle between the radial inner wall and the central axis.

In accordance with another aspect of the present invention, there is provided a method for manufacturing a chucking device arranged to removably hold a disk with a central opening, including the steps of: fitting a turntable to a shaft having a central axis from above to thereby fix the turntable to the shaft, the turntable including a disk support surface arranged to support the disk; fitting a cone to the shaft from above to thereby arrange the cone in such a way that the cone is axially slidable with respect to the shaft, the cone including an annular disk holding surface inclined radially outwards and downwards; fitting an annular yoke to the shaft from above to thereby fix the yoke to the shaft, the yoke including an upper surface having an annular recess defined thereon; applying an adhesive agent on a region of the upper surface of the yoke existing radially inwards of the annular recess; and fixing a clamp magnet to the upper surface of the yoke through the adhesive agent; wherein the recess includes a radial outer wall parallel to the central axis or inclined radially outwards and axially upwards and a radial inner wall inclined radially inwards and axially upwards; and the angle between the radial outer wall and the central axis is smaller than the angle between the radial inner wall and the central axis.

With the present invention, it is possible to reliably prevent the adhesive agent from being oozed out from between the yoke and the clamp magnet.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

First Preferred Embodiment

Overall Structure of Brushless Motor

A first preferred embodiment of a brushless motor in accordance with the present invention will now be described with reference to FIG. 1, which is an axially-cut schematic section view showing the first preferred embodiment of the present brushless motor.

Figure 1:
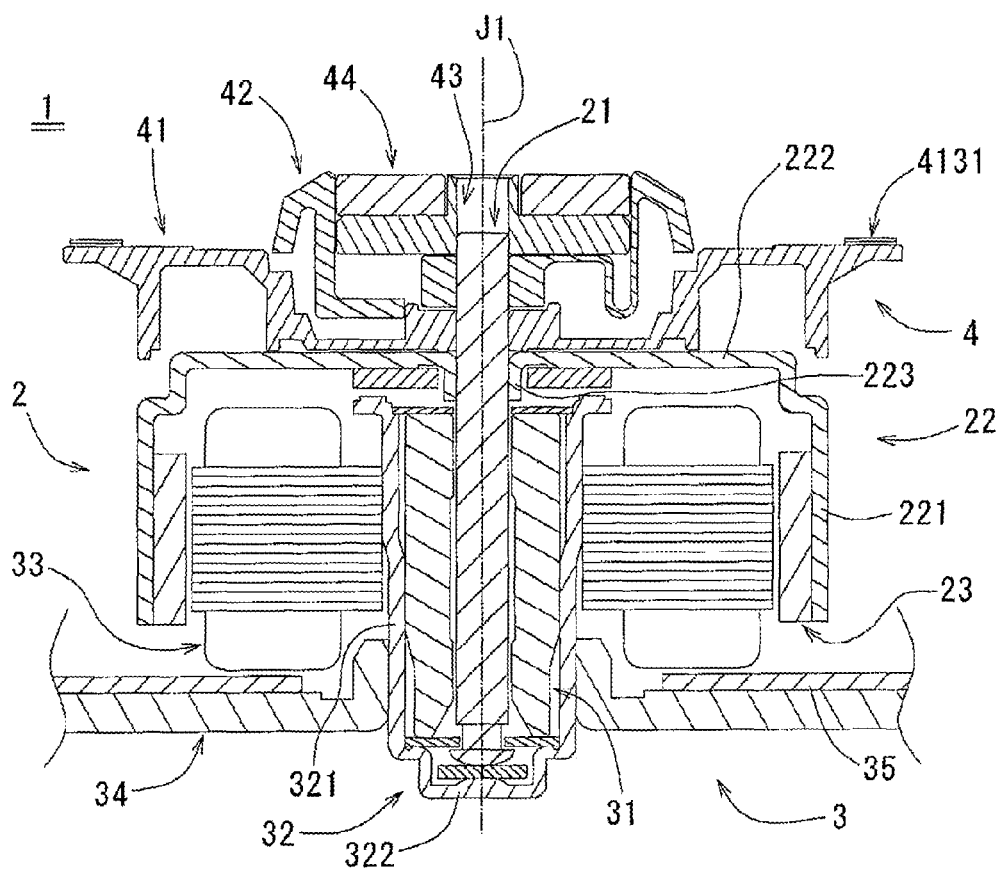
FIG. 1 is an axially-cut schematic section view showing one embodiment of a brushless motor in accordance with the present invention.

Referring to FIG. 1, a brushless motor 1 preferably includes a motor unit, which has a rotor unit 2 rotatingly driven about a specified center axis J1; a stator unit 3 arranged to rotatably support the rotor unit 2; and a chucking device 4 arranged axially above the rotor unit 2.

First, description will be made on the rotor unit 2.

The rotor unit 2 preferably includes a substantially cylindrical shaft 21 arranged in a coaxial relationship with the center axis J1; a rotor holder 22 fixed to the shaft 21 for rotation about the center axis J1; and an annular rotor magnet 23 fixed to the rotor holder 22 for rotation about the central axis J1 together with the shaft 21.

The rotor holder 22 preferably includes an outer cylinder portion 221 having an inner circumferential surface to which an outer circumferential surface of the rotor magnet 23 is fixed; a planar cover portion 222 extending from the outer cylinder portion 221 toward the center axis J1; and an inner cylinder portion 223 having an inner circumferential surface fixed to an outer circumferential surface of the shaft 21.

Next, description will be given on the stator unit 3. In the following description, the direction running radially with respect to the central axis J1 will be simply referred to as "radial", and the direction running circumferentially about the central axis J1 will be simply referred to as "circumferential".

The stator unit 3 preferably includes a substantially-cylindrical, sintered-material-made sleeve 31 having an inner circumferential surface arranged to radially support the shaft 21 in a rotatable manner; a housing 32 having a cylinder portion 321 with an inner circumferential surface arranged to hold an outer circumferential surface of the sleeve 31 and a bottom portion 322 for covering a lower extension of the cylinder portion 321; a stator 33 having an inner circumferential surface fixed to an outer circumferential surface of the cylinder portion 321 of the housing 32 and an outer circumferential surface radially opposed to an inner circumferential surface of the rotor magnet 23; a substantially flat attachment plate 34 arranged axially below the stator 33, the attachment plate 34 having an inner circumferential surface fixed to an outer circumferential surface of the cylinder portion 321 of the housing 32; and a circuit board 35 arranged on an upper surface of the attachment plate 34.

The stator 33 is designed to generate magnetic fields as an electric current is supplied to the stator 33 from an external power supply not shown in the drawings. A rotational driving force acting about the center axis J1 is imparted to the rotor unit 2 by the magnetic interaction between the magnetic fields and the rotor magnet 23.

(Structure of Chucking Device)

Figure 2:
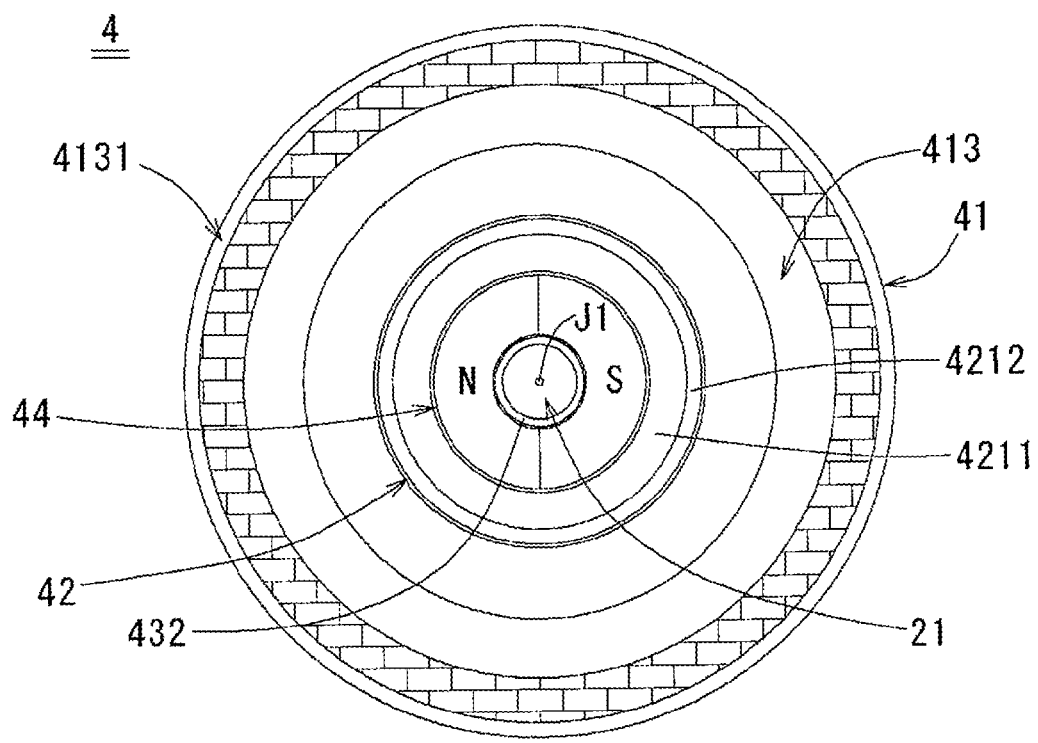
FIG. 2 is a schematic top plan view showing one embodiment of a chucking device in accordance with the present invention.

Next, the chucking device 4 of the present invention will be described with reference to FIGS. 1 through 9. FIG. 2 is a top plan view showing the present chucking device 4.

Referring to FIGS. 1 and 2 (or FIG. 8), the chucking device 4 includes a turntable 41, formed of injection-molded resin material, arranged on an upper surface of the cover portion 222 of the rotor holder 22 and fixed to the shaft 21; a cone 42 arranged axially above the turntable 41, the cone 42 having a disk holding portion 421 for making contact with a central opening of a disk not shown in the drawings, the cone 42 formed of injection-molded resin material; a yoke 43, formed of a magnetic body, arranged axially above the cone 42 and fixed to the shaft 21; and a substantially annular clamp magnet 44 fixed to an upper surface of the yoke 43.

An annular disk support portion 4131 made of rubber or the like is formed on the turntable 41 radially outwardly of the cone 42. The disk support portion 4131 has an upper surface that makes contact with a lower surface of a disk. Thus, the upper surface of the disk support portion 4131 serves as a support surface on which the disk is mounted to the chucking device 4. Herein, the clamp magnet 44 of the present embodiment is magnetized with two poles in a circumferential direction.

Figure 3:
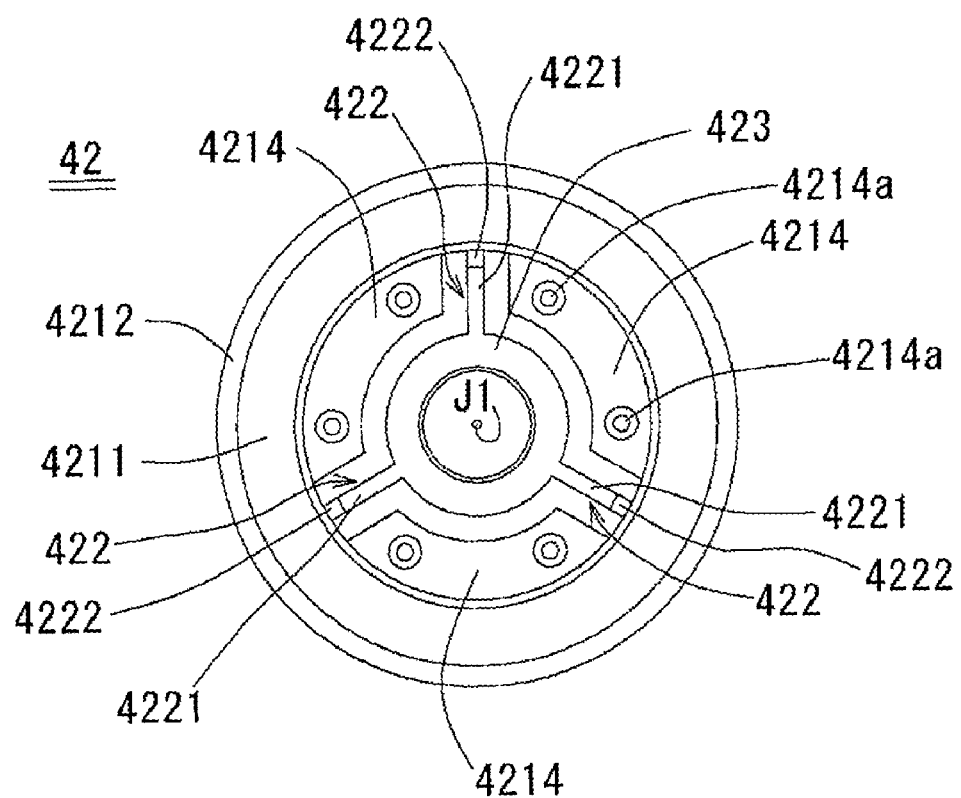
FIG. 3 is a schematic top plan view illustrating a cone that forms a part of the present chucking device.
Figure 4:
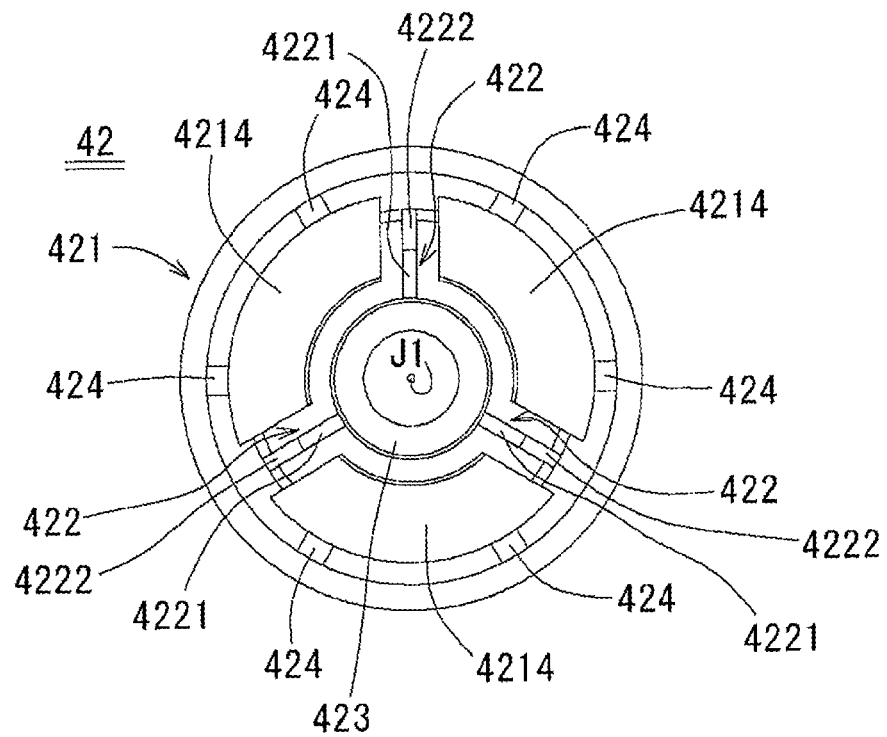
FIG. 4 is a schematic bottom plan view illustrating the cone that forms a part of the present chucking device.
Figure 5:
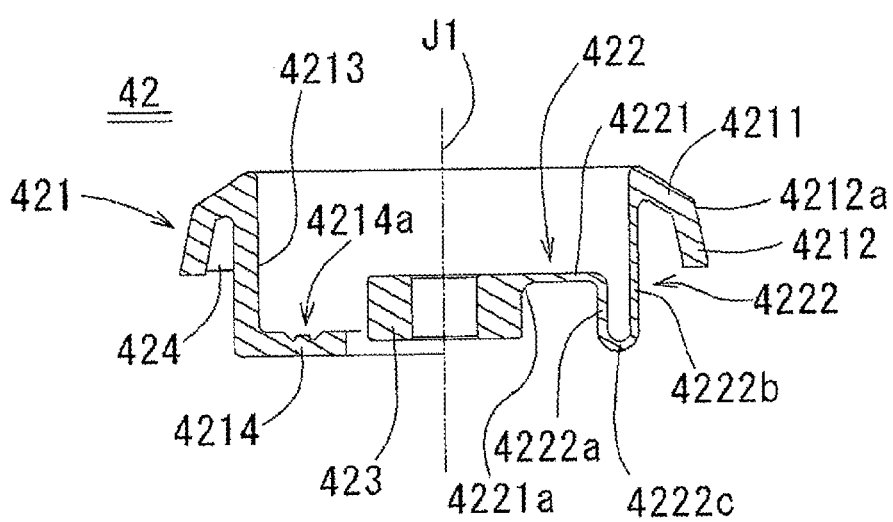
FIG. 5 is an axially-cut schematic section view illustrating the cone that forms a part of the present chucking device.

Referring to FIGS. 3 through 5, the cone 42 includes an annular disk holding portion 421 having a disk holding surface 4212a for making contact with the central opening of the disk; a plurality of arm portions 422 each extending radially inwardly from the disk holding portion 421; and a substantially cylindrical shaft-fixed portion 423 having an inner circumferential surface fixed to the outer circumferential surface of the shaft 21. In the present embodiment, the arm portions 422 include three arm portions arranged at a substantially equal interval, i.e., 120 degrees.

The disk holding portion 421 includes a first slanting portion 4211 inclined radially outwardly and axially downwardly; and a second slanting portion 4212 formed radially outwardly of the first slanting portion 4211 and inclined radially outwardly and axially downwardly. The center axis J1 and the first slanting portion 4211 make an acute angle which is greater than that made between the center axis J1 and the second slanting portion 4212.

The first slanting portion 4211 has an outer surface that makes contact with the lower edge of the central opening of the disk when the disk is being mounted to the chucking device 4. Then, the lower edge of the central opening of the disk is guided to the second slanting portion 4212 by the first slanting portion 4211.

The disk holding surface 4212a, which is the outer surface of the second slanting portion 4212, makes contact with the lower region of the inner circumferential surface of the central opening of the disk when the disk has been mounted to the chucking device 4. The disk holding surface 4212a holds the disk in place in a radial direction and supports the disk in an axial direction.

Each of the arm portions 422 includes a support portion 4221 extending radially outwardly from the shaft-fixed portion 423 and an elastically deformable portion 4222 continuously extending from the support portion 4221 and joining to the disk holding portion 421.

The support portion 4221 is connected to the upper end portion of the outer circumferential surface of the shaft-fixed portion 423. Furthermore, the support portion 4221 extends perpendicularly to the center axis J1. The axial position of an upper surface of the support portion 4221 is substantially flush with the axial position of an upper surface of the shaft-fixed portion 423. The lower surface of the support portion 4221 has a curved surface region 4221a whose axial width is increased axially downwardly toward the shaft-fixed portion 423 (namely, in a radial inward direction). The presence of the curved surface region 4221a makes it possible to increase the cross-sectional area of the support portion 4221 in the radial inward direction. Therefore, it is possible to improve the flowability of a resin material during the injection-molding process of the cone 42. As a result, it becomes possible to reduce occurrence of molding defects in the injection-molding process of the cone 42.

The elastically deformable portion 4222 is connected to the support portion 4221 and is formed into a substantially U-like shape. The elastically deformable portion 4222 includes a first deformation portion 4222a extending axially downwardly from the support portion 4221; a second deformation portion 4222b provided closer to the disk away from the first deformation portion 4222a, i.e., radially outwardly of the first deformation portion 4222a, and connected to the disk holding portion 421; and a third deformation portion 4222c for interconnecting the first deformation portion 4222a and the second deformation portion 4222b.

The first deformation portion 4222a, the second deformation portion 4222b and the third deformation portion 4222c are formed to have the same circumferential width. The first deformation portion 4222a has a radial thickness greater than that of the second deformation portion 4222b. In the present embodiment, the radial thickness of the first deformation portion 4222a is equal to about 0.5 mm and the radial thickness of the second deformation portion 4222b is equal to about 0.4 mm.

Owing to the fact that the second deformation portion 4222b is radially thicker than the first deformation portion 4222a, it is possible to ensure that the cross-sectional area of the second deformation portion 4222b taken perpendicularly to the center axis J1 becomes greater the cross-sectional area of the first deformation portion 4222a taken perpendicularly to the center axis J1. Therefore, it is possible to improve the flowability of a resin material during the injection-molding process of the cone 42. As a result, it becomes possible to reduce occurrence of molding defects in the injection-molding process of the cone 42.

In those positions of the disk holding portion 421 circumferentially deviated from the arm portions 422, there are provided a plurality of arcuate peripheral wall portions 4213 each extending axially downwardly from the radial inner end of the first slanting portion 4211; and a plurality of planar portions 4214 each extending radially inwardly from the lower ends of the peripheral wall portions 4213. The peripheral wall portions 4213 and the planar portions 4214 are respectively formed between the circumferentially neighboring arm portions 422 (the number of these portions are three in the present embodiment).

The planar portions 4214 are formed into a fan shape so that the circumferential width thereof can be decreased radially inwardly. The circumferential side surfaces of each of the planar portions 4214 faces circumferentially with the circumferential side surfaces of each support portion 4221 of the arm portions 422. Furthermore, the circumferential side surfaces of each of the planar portions 4214 are formed substantially parallel to the circumferential side surfaces of each support portion 4221 of the arm portions 422.

In the present embodiment, each of the peripheral wall portions 4213 has a radial thickness of about 0.9 mm and each of the planar portions 4214 has an axial thickness of about 1.0 mm. On the upper surface of the planar portions 4214, there is formed a gate portion 4214a used as an inlet port of a mold (not shown) through which a resin material flows in the molding process. The gate portion 4214a is formed in each of the three planar portions 4214. An ejector pin (not shown) for separating the cone 42 from the mold comes into contact with the lower surface of each of the planar portions 4214. The cone 42 as a molded product is separated apart from the mold by means of the ejector pin.

Although the gate portion 4214a is provided on the upper surface of each of the planar portions 4214 and the ejector pin is brought into contact with the lower surface of each of the planar portions 4214 in the present embodiment, it may be possible to form the gate portion 4214a on the lower surface of each of the planar portions 4214, while allowing the ejector pin to make contact with the upper surface of each of the planar portions 4214. By forming the gate portion 4214a in each of the planar portions 4214 which is thicker than the remaining portions of the cone 42, it becomes possible to secure the strength required for cutting away the gate portion 4214a from the cone 42 as a molded product in the mold separation process.

Further, since each of the planar portions 4214 has an increased axial thickness, it is possible to increase the area over which the inner circumferential surfaces of the planar portions 4214 make sliding movement with the outer circumferential surface of a cylinder portion 411 of the turntable 41. As a result, it is possible to prevent radial deformation of the disk holding surface 4212a of the cone 42, which would otherwise occur during axial downward movement of the cone 42. Consequently, it is possible to enhance the centering accuracy of the disk relative to the center axis J1 when the disk is mounted to the chucking device 4.

Additional gate portions 423a are formed on the lower surface of the shaft-fixed portion 423 of the cone 42. In the present embodiment, three gate portions 423a are formed on the lower surface of the shaft-fixed portion 423 to be circumferentially spaced apart with one another. Since the gate portions 423a are provided in the central portion of the cone 42, it is possible to improve the flowability of a resin material when injection-molding the cone 42. Therefore, it is possible to reduce molding defects of the cone 42. Since the axial thickness of the shaft-fixed portion 423 is greater than that of the remaining portions of the cone 42, it is possible to secure the strength required in cutting away the gate portion 423a from the cone 42 as a molded product in the mold separation process.

The inner circumferential surfaces of the planar portions 4214 are formed to have surface roughness smaller than that of the remaining portions of the cone 42. Similarly, the portion of the outer circumferential surface of the cylinder portion 411 that makes sliding movement with the inner circumferential surfaces of the planar portions 4214 is formed to have surface roughness smaller than that of the remaining portions of the turntable 41. In the present embodiment, the surface roughness Ry of the inner circumferential surface of the planar portions 4214 is set equal to about 1.0 μm or less. In this regard, the Ry is defined in Japanese Industrial Standard (JIS) and refers to a value found by summing up the height from a mean line to a highest ridge peak and the depth from the mean line to a lowest valley bottom, wherein the mean line denotes a mean line of standard length taken from a roughness curve obtained by measurement.

Use of this structure makes it possible to reduce the frictional force when the inner circumferential surfaces of the planar portions 4214 make sliding movement with the outer circumferential surface of the cylinder portion 411. Therefore, it is possible to reduce the force (disk mounting force) required in mounting the disk to the chucking device 4.

The radial distance between the radially outer surface of the second deformation portion 4222b of the elastically deformable portion 4222 and the center axis J1 is smaller than the radial distance between the outer circumferential surface of each of the peripheral wall portions 4213 and the center axis J1. The radial distance between the radially inner surface of the second deformation portion 4222b and the center axis J1 is nearly the same as the radial distance between the inner circumferential surface of each of the peripheral wall portions 4213 and the center axis J1. Therefore, when injection-molding the cone 42, the mold for performing the injection-molding to form the cone 42 can be constructed from two molds, i.e., upper and lower molds. This makes it possible to simplify the mold in construction.

The axial position in which the radially outer surface of the second deformation portion 4222b is joined to the lower surface of the first slanting portion 4211 of the disk holding portion 421 lies axially above the axial position in which the lower surface of the first slanting portion 4211 of the disk holding portion 421 is joined to the outer circumferential surface of each of the peripheral wall portions 4213. This makes it possible to increase the axial length of the second deformation portion 4222b, thereby allowing the second deformation portion 4222b to be elastically deformed with a small force. As a consequence, it becomes possible to reduce the disk mounting force.

Ribs 424 for interconnecting the peripheral wall portions 4213 and the first and second slanting portions 4211 and 4212 are formed in a radial gap between the outer circumferential surfaces of the peripheral wall portions 4213 and the first and second slanting portions 4211 and 4212 of the disk holding portion 421. The ribs 424 are formed two-by-two on each of the peripheral wall portions 4213 to be circumferentially spaced apart with each other. In the present embodiment, the interval between two neighboring ribs 424 is set equal to about 60 degrees.

Figure 6A:
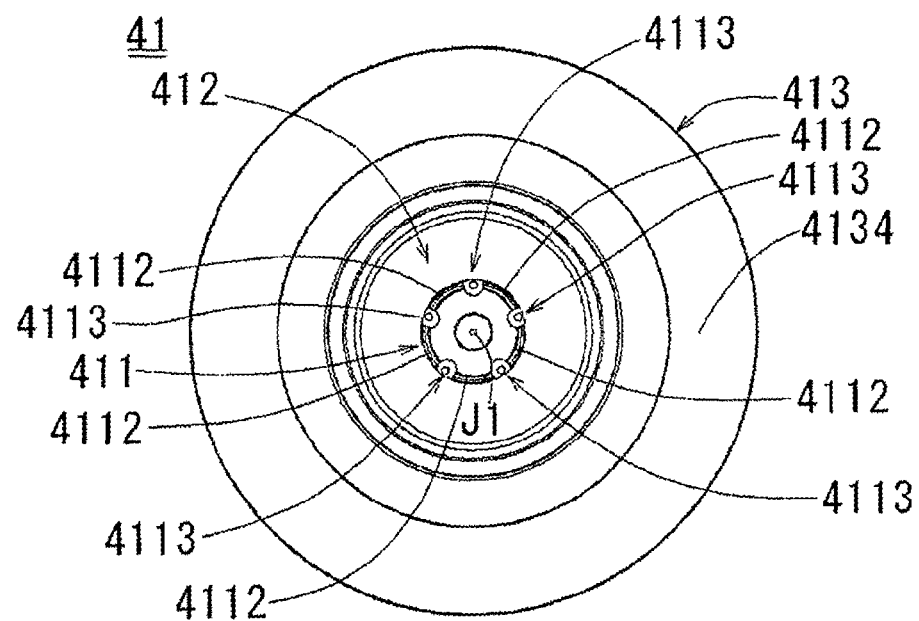
FIG. 6A is a top plan view showing a turntable that forms a part of the present chucking device.
Figure 6B:
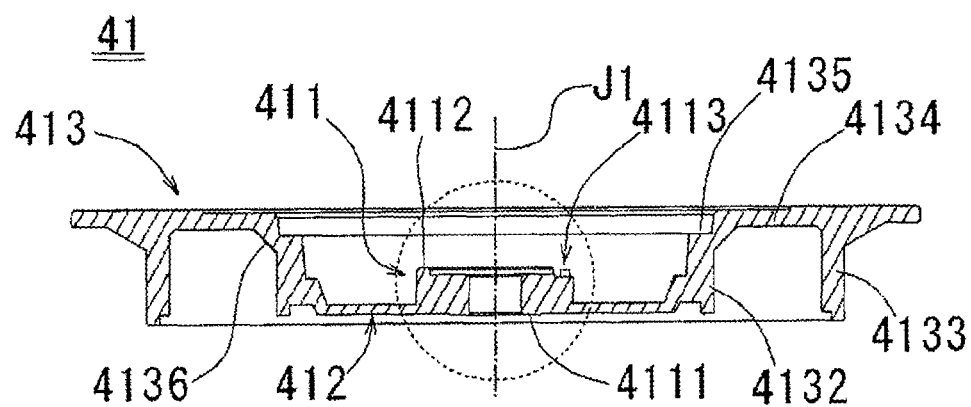
FIG. 6B is an axially-cut schematic section view thereof.

Referring to FIGS. 6A and 6B, the turntable 41 includes a cylinder portion 411 of substantially cylindrical shape having an inner circumferential surface fixed to the outer circumferential surface of the shaft 21, a substantially planar radial extension portion 412 extending radially outwardly from an axial lower end of the cylinder portion 411, and a disk support part 413 formed radially outwardly of the radial extension portion 412 for supporting the disk.

Figure 7A:
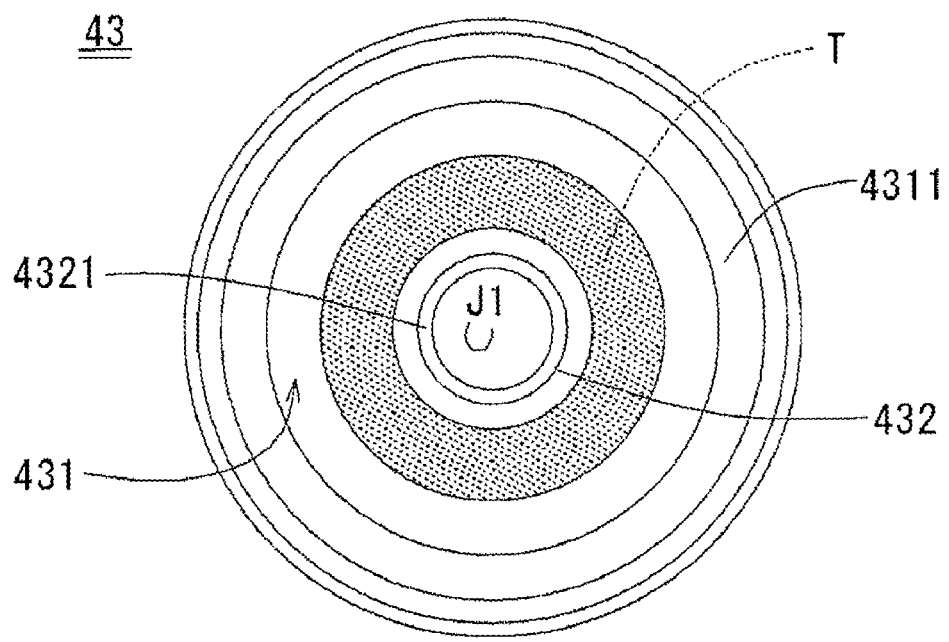
FIG. 7A is a top plan view showing a yoke that forms a part of the present chucking device and FIG. 7B is a an axially-cut schematic section view thereof.
Figure 7B:
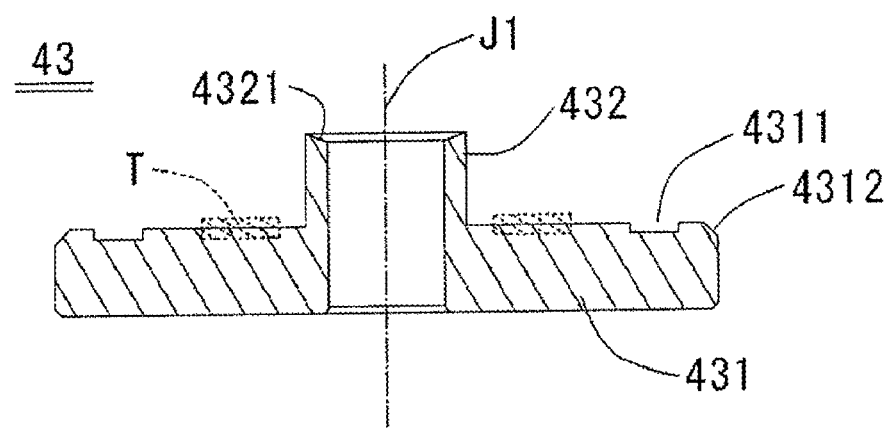

Referring to FIGS. 7A and 7B, the yoke 43 includes an annular plate portion 431 having an inner circumferential surface fixed to the outer circumferential surface of the shaft 21, the plate portion 431 being widened in a direction perpendicular to the center axis J1, and a cylindrical portion 432 of a substantially cylindrical shape extending axially upwardly from an upper surface of the plate portion 431. The inner circumferential surface of the cylindrical portion 432 has the same diameter as that of the inner circumferential surface of the plate portion 431.

An axially depressed annular recess portion 4311 is formed in the outer marginal region of the upper surface of the plate portion 431. A beveled surface 4312 inclined radially outwardly and axially downwardly is formed between the upper surface and the outer circumferential surface of the plate portion 431.

The upper surface of the cylindrical portion 432 is formed of a slanting guide surface 4321 whose diameter is decreased in an axially downward direction.

Figure 8:
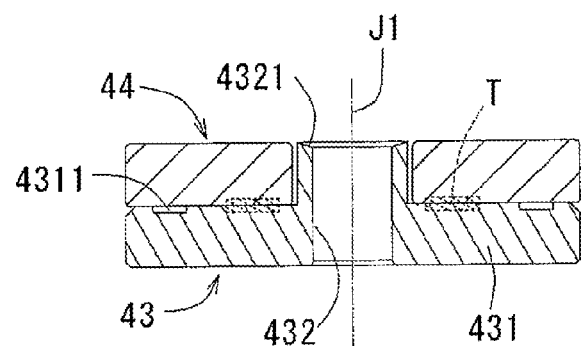
FIG. 8 is an axially-cut schematic section view depicting a state that a clamp magnet is mounted to the yoke forming a part of the present chucking device.

Referring to FIG. 8, the clamp magnet 44 is adhesively bonded to the upper surface of the plate portion 431 of the yoke 43. The inner circumferential surface of the clamp magnet 44 is radially spaced apart from the outer circumferential surface of the cylinder portion 432. The radial position of the outer circumferential surface of the clamp magnet 44 is substantially the same as the radial position of the outer circumferential surface of the plate portion 431. By attaching the clamp magnet 44 with reference to the outer diameter of the plate portion 431, it is possible to prevent the outer circumferential surface of the clamp magnet 44 from making contact with the inner circumferential surface of the peripheral wall portions 4213 of the cone 42 and the radially inner surface of the second deformation portion 4222b. This makes it possible to prevent occurrence of defects such as failure of axial downward movement of the disk holding portion 421, deformation of the disk holding portion 421 and the like, which would otherwise occur when the clamp magnet 44 comes into contact with the cone 42. As a result, it is possible to provide a highly reliable chucking device and a brushless motor equipped with the chucking device.

An adhesive agent is applied on a region T (a dot-line hatched region) of the upper surface of the plate portion 431 of the yoke 43 lying radially inwardly of the recess portion 4311. This ensures that, even if the adhesive agent is spread radially outwardly when attaching the clamp magnet to the plate portion 431 of the yoke 43, the adhesive agent thus spread is received in the recess portion 4311. Therefore, it is possible to prevent the adhesive agent from being squeezed radially outwardly toward the outer circumferential surface of the plate portion 431 of the yoke 43.

A tapering groove is formed between the lower surface of the clamp magnet 44 and the beveled surface 4312 of the plate portion 431 of the yoke 43. Therefore, even if the adhesive agent is spread radially outwardly from the recess portion 4311, the adhesive agent can be accommodated in the tapering groove between the lower surface of the clamp magnet 44 and the beveled surface 4312 of the plate portion 431 of the yoke 43. This makes it possible to more reliably prevent the adhesive agent from being squeezed radially outwardly toward the outer circumferential surface of the plate portion 431 of the yoke 43. Therefore, the adhesive agent is cured between the yoke 43 and the clamp magnet 44, thus making it possible to prevent failure of axial downward movement of the disk holding portion 421. As a result, it is possible to provide a highly reliable chucking device and a brushless motor equipped with the chucking device.

Figure 9:
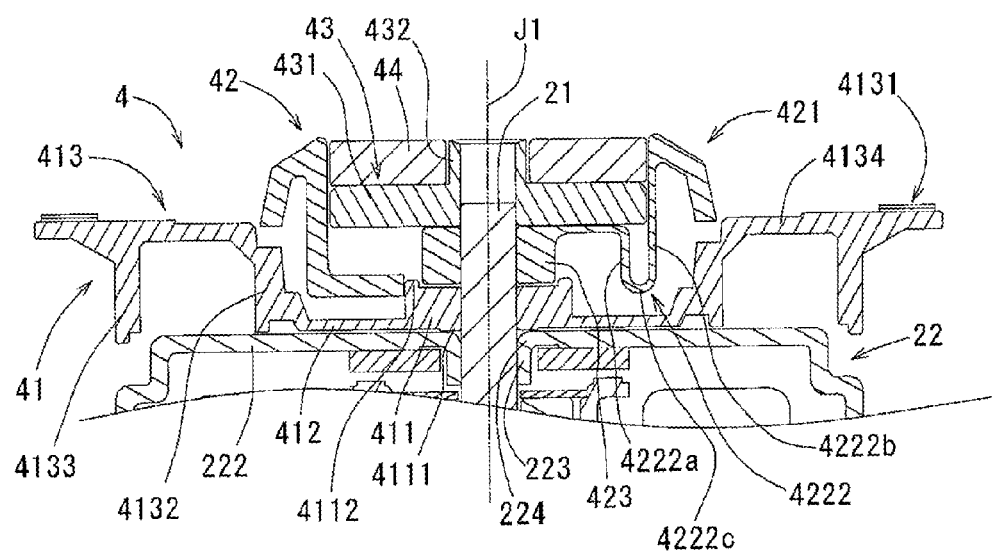
FIG. 9 is an enlarged view showing the chucking device of the brushless motor shown in FIG. 1 and its neighboring portions in an enlarged scale.

Referring to FIG. 9, the inner cylinder portion 223 of the rotor holder 22 is curved axially downwardly from the cover portion 222. Thus, a curved portion 224 is formed between the inner cylinder portion 223 and the cover portion 222.

An annular first protrusion 4111 protruding axially downwardly is formed in an inner marginal region on the lower surface of the cylinder portion 411 of the turntable 41. A plurality of arcuate second protrusions 4112 protruding axially upwardly is formed in an outer marginal region on the upper surface of the cylinder portion 411. The first protrusion 4111 has a lower surface that faces toward the upper surface of the curved portion 224 and the upper surface of the cover portion 222 in an axially spaced-apart relationship therewith. The second protrusions 4112 are annularly arranged to be circumferentially spaced apart with one another (see FIG. 6A).

Figure 6C:
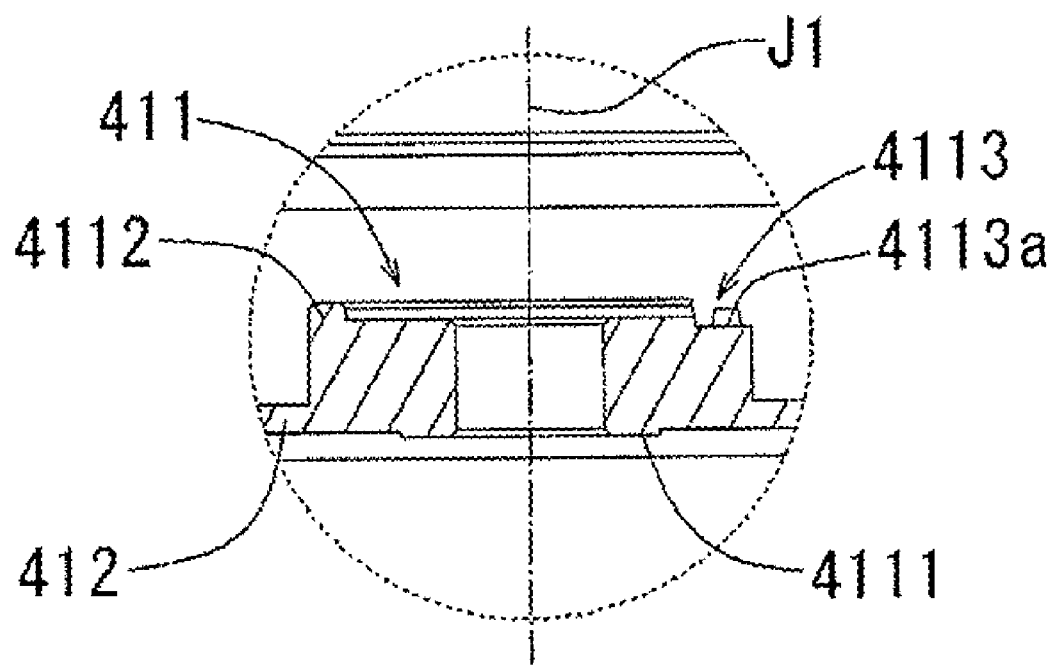
FIG. 6C is an enlarged view of the portion designated by a dot line circle in FIG. 6B.

Referring to FIGS. 6A through 6C, gate portions 4113 are provided in the circumferential gaps between the second protrusions 4112 circumferentially neighboring with one another. Each of the gate portions 4113 is formed in a depressed shape and has a surface formed axially below the inner peripheral upper surface of the cylinder portion 411. Each of the gate portions 4113 has an inner circumference provided radially inwardly of the outer circumferential surface of the shaft-fixed portion 423 of the cone 42. Each of the gate portions 4113 extends radially outwardly beyond the outer circumferential surface of the shaft-fixed portion 423.

Formed in each of the gate portions 4113 is an injection portion 4113a that axially faces toward an injection port (not shown) of a mold through which a resin material is injected into the mold. The injection portion 4113a is provided so that it can be arranged radially outwardly of the outer circumferential surface of the shaft-fixed portion 423. When the turntable 41 as a molded product is separated from the mold, the injection portion 4113a is formed into a protrusion by pulling the resin material in an axially upward direction in which the injection port of the mold is moved away from the injection portion 4113a. Since the injection portion 4113a is provided radially outwardly of the outer circumferential surface of the shaft-fixed portion 423, it is possible to keep the lower surface of the shaft-fixed portion 423 from making contact with the injection portion 4113a. This makes it possible to reduce the size of an axial gap between the lower surface of the shaft-fixed portion 423 and the upper surface of the cylinder portion 411 axially facing toward the shaft-fixed portion 423. As a result, it becomes possible to assure thickness reduction of the chucking device 4. Moreover, since the cylinder portion 411 is formed in the central region of the turntable 41, the flowability of a resin material can be improved by arranging the gate portions 4113 in the cylinder portion 411. This makes it possible to enhance the moldability of the turntable 41, while reducing occurrence of molding defects which would occur in the turntable 41.

The outer diameter of the shaft-fixed portion 423 of the cone 42 is smaller than the inner diameter of the second protrusions 4112. The axial position of the lower surface of the shaft-fixed portion 423 is axially below the axial position of the upper surfaces of the second protrusions 4112. The lower surface of the shaft-fixed portion 423 faces toward the upper surface of the cylinder portion 411 of the turntable 41 lying radially inwardly of the second protrusions 4112, with a radial gap left therebetween. Employment of the second protrusions 4112 makes it possible to secure an area over which the inner circumferential surface of the planar portions 4214 of the cone 42 makes sliding movement with the outer circumferential surface of the cylinder portion 411 of the turntable 41. Seeing that the outer diameter of the shaft-fixed portion 423 of the cone 42 is smaller than the inner diameter of the second protrusions 4112 and further that the lower surface of the shaft-fixed portion 423 is arranged axially below the upper surfaces of the second protrusions 4112, it is possible to assure thickness reduction of the chucking device 4. It is also possible to axially elongate the shaft-fixed portion 423, which increases the contact area between the inner circumferential surface of the shaft-fixed portion 423 and the outer circumferential surface of the shaft 21. This makes it possible to rigidly fix the cone 42 to the shaft 21.

For the purpose of their fixation to the shaft 21, the rotor holder 22 and the turntable 41 can be mounted with increased accuracy relative to the center axis J1. Furthermore, since the respective parts are arranged to be axially spaced apart with each other, it is possible to prevent deflection of the respective parts relative to the center axis J1, which would otherwise occur when the axially neighboring parts are in contact with each other. This makes it possible to mount the respective parts with increased accuracy relative to the center axis J1.

The elastically deformable portion 4222 is arranged radially outwardly of the cylinder portion 411 and is formed from the upper surface of the cylinder portion 411 to the axial lower side thereof. Since the radial extension portion 412 is joined to the lower end of the outer circumferential surface of the cylinder portion 411, it is possible to leave a sufficiently great axial gap between the lower end of the elastically deformable portion 4222 and the upper surface of the radial extension portion 412. This makes it possible to reduce the axial size of the chucking device 4 and also to secure great enough axial length of the first and second deformation portions 4222a and 4222b of the elastically deformable portion 4222. Since the axial length of the second deformation portion 4222b can be secured in this manner, it is possible to reduce the disk mounting force. Furthermore, there is provided a great enough radial gap between the first deformation portion 4222a of the elastically deformable portion 4222 and the cylinder portion 411 of the turntable 41. Therefore, even if the first deformation portion 4222a undergoes radially inward elastic deformation when the disk has been mounted to the chucking device 4, it is possible to avoid contact between the first deformation portion 4222a and the cylinder portion 411. Consequently, it is possible to axially downwardly move the disk holding portion 421 in a smooth manner, which in turn reduces the disk mounting force.

The lower surface of the plate portion 431 of the yoke 43 faces toward the upper surface of the shaft-fixed portion 423 and the upper surface of the support portion 4221 to be axially spaced apart with each other. Furthermore, the outer circumferential surface of the plate portion 431 of the yoke 43 and the outer circumferential surface of the clamp magnet 44 face toward the inner circumferential surface of the peripheral wall portions 4213 of the disk holding portion 421 and the radial inner surface of the second deformation portion 4222b of the arm portions 422 to be radially spaced apart with each other. Moreover, the upper end of the cylindrical portion 432 of the yoke 43 extends axially upwardly beyond the upper end surface of the shaft 21.

For the purpose of their fixation to the shaft 21, the cone 42 and the yoke 43 can be mounted with increased accuracy relative to the center axis J1. Furthermore, since the respective parts are arranged to be axially spaced apart with each other, it is possible to prevent deflection of the respective parts relative to the center axis J1, which would otherwise occur when the axially neighboring parts are in contact with each other. This makes it possible to mount the respective parts with increased accuracy relative to the center axis J1.

(Structure of Disk Drive Apparatus)

Figure 10:
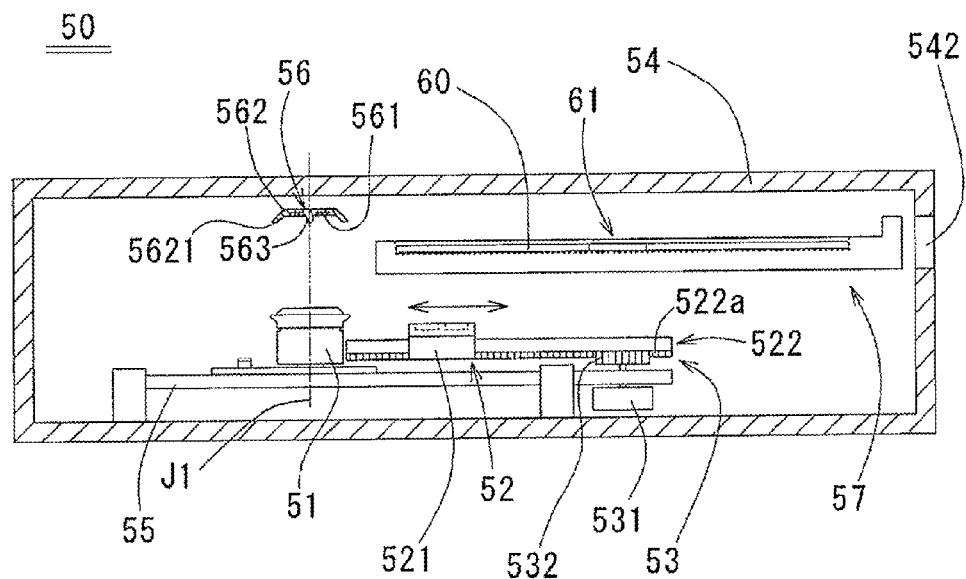
FIG. 10 is an axially-cut schematic section view showing one embodiment of a disk drive apparatus in accordance with the present invention.

Next, one embodiment of a disk drive apparatus equipped with the present motor will be described with reference to FIG. 10. FIG. 10 is an axially-cut schematic section view showing the present disk drive apparatus.

Referring to FIG. 10, the disk drive apparatus 50 preferably includes a spindle motor 51 arranged to rotate a disk 60 having a central opening 61, the spindle motor 51 designed to bring itself into coaxial alignment with the rotational axis of the disk 60 when inserted into the central opening 61 of the disk 60, an optical pickup mechanism 52 arranged to record and reproduce information on and from the disk 60 by irradiating a laser beam toward the disk 60, a moving mechanism 53 arranged to move the optical pickup mechanism 52 in a radial direction of the disk 60, and a housing 54 arranged to receive the spindle motor 51, the optical pickup mechanism 52 and the moving mechanism 53.

The spindle motor 51 and the optical pickup mechanism are held in place by means of a chassis 55. As the chassis 55 is moved at least in an axial direction, the central opening 61 of the disk 60 is mounted to the chucking device of the spindle motor 51. The chassis 55 is provided with an aperture and the optical pickup mechanism 52 is arranged inside the aperture.

The moving mechanism 53 includes a drive motor 531 with a geared output shaft and a driving gear 532 arranged to transfer the torque of the drive motor 531.

A gate hole 542 through which the disk 60 is inserted and taken out is defined in the housing 54. Arranged within the housing 54 is a tray 57 that holds and transports the disk 60 to the spindle motor 51. The tray 57 is able to move outside the housing 54.

The optical pickup mechanism 52 preferably includes a recording and reproducing unit 521 arranged to irradiate a laser beam and a carriage unit 522 arranged to carry the recording and reproducing unit 521, the carriage unit 522 provided to extend perpendicularly to the radial direction of the disk 60 along which the recording and reproducing unit 521 moves. The carriage unit 522 has a rack portion 522a that comes into meshing engagement with the driving gear 532. The recording and reproducing unit 521 is moved in the radial direction together with the carriage unit 522.

As the driving gear 532 attached to the drive motor 531 rotates in meshing engagement with the rack portion 522a of the carriage unit 522, the carriage unit 522 is moved toward or away from the spindle motor 1 in the radial direction of the disk 60. Such movement of the carriage unit 522 causes the recording and reproducing unit 521 to move in the radial direction.

By applying the present brushless motor 1 to the spindle motor 51 of the disk drive apparatus 50, it is possible to cost-effectively provide a disk drive apparatus capable of centering the disk 60 into alignment with the spindle motor 51 with increased accuracy.

(Operation of Chucking Device during Disk Mounting Process)

Figure 11:
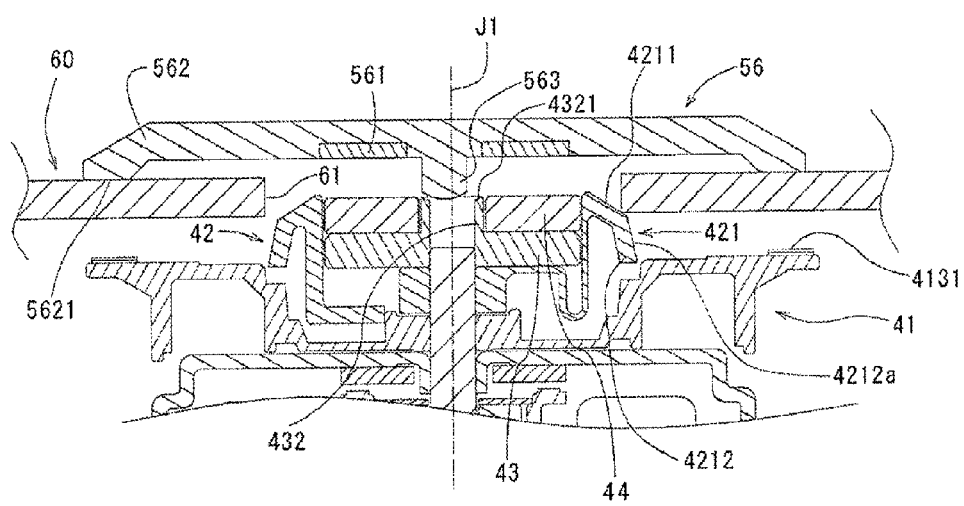
FIG. 11 is an axially-cut schematic section view depicting a state that a disk is being mounted to the present chucking device.
Figure 12:
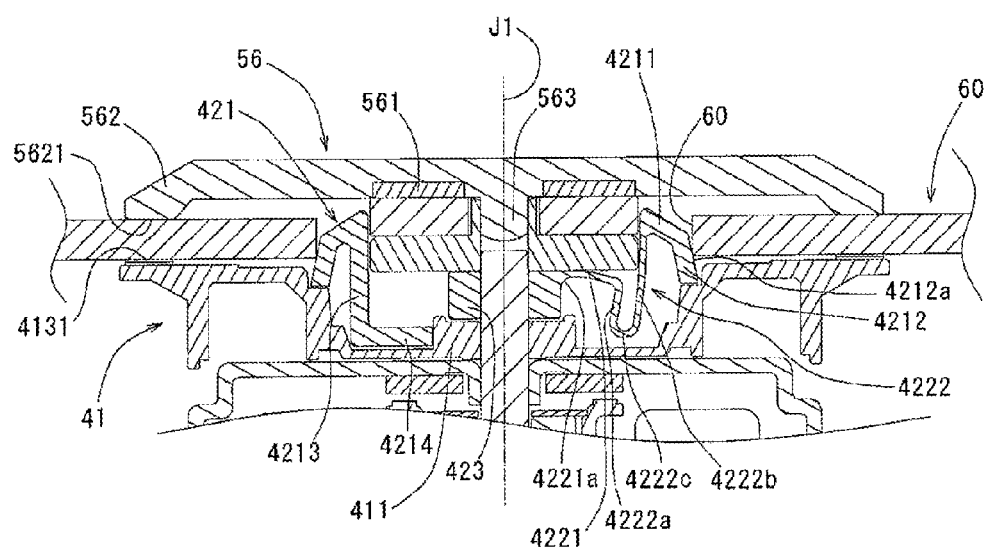
FIG. 12 is an axially-cut schematic section view depicting a state that the disk has been mounted to the present chucking device.

Next, the operation of the cone 42 during the process of mounting the disk 60 to the chucking device 4 will be described with reference to FIGS. 11 and 12. FIG. 11 is an axially-cut schematic section view depicting a state that the disk 60 begins to make contact with the chucking device 4. FIG. 12 is an axially-cut schematic section view depicting a state that the disk 60 has been mounted to the chucking device 4.

Referring to FIG. 11, a clamp member 56 is arranged on the upper surface of the disk 60. The clamp member 56 preferably includes a magnetic clamp yoke 561 attracted to the clamping magnet 44, a resin-made pressing portion 562 integrally formed with the clamp yoke 561 and arranged to press the upper surface of the disk 60 and a centering protrusion 563 extending axially downwards from the pressing portion 562 in a substantially coaxial relationship with the center axis J1, the pressing portion 562 and the centering portion 563 being formed in a single unit. The pressing portion 562 has an annular disk contact surface 5621 that makes contact with the upper surface of the disk 60. The diameter of the disk contact surface 5621 is substantially the same as the diameter of the disk support portion 4131 of the turntable 41.

The central opening 61 of the disk 60 comes into contact with the first slanting portion 4211 of the cone 42. The central opening 61 of the disk 60 is guided toward the second slanting portion 4212 by the first slanting portion 4211. Thus, the center of the central opening 61 is substantially aligned with the center axis J1.

The clamp yoke 561 of the clamp member 56 is magnetically attracted by the clamp magnet 44. At this time, the centering protrusion 563 is inserted into the cylindrical portion 432 under the guidance of the guide surface 4321 of the cylindrical portion 432 of the yoke 43, thereby centering the centering protrusion 563 into alignment with the center axis J1. Since the centering protrusion 563 is smoothly guided into alignment with the center axis J1 by the guide surface 4321, it is possible to reduce the disk mounting force.

Referring to FIG. 12, the whole circumferential extension of the central opening 61 of the disk 60 makes contact with the disk holding surface 4212a of the second slanting portion 4212 when the lower surface of the disk 60 is brought into contact with the disk support portion 4131.

Further, as shown in FIG. 12, the support portion 4221 and the second deformation portion 4222b of the elastically deformable portion 4222 are heavily deformed in the arm portions 422. The support portion 4221 is elastically deformed in an axially downward direction, at which time the joining position of the support portion 4221 and the shaft-fixed portion 423 acts as a fulcrum point. The second deformation portion 4222b is radially inwardly deformed, at which time the joining position of the first slanting portion 4211 of the disk holding portion 421 and the second deformation portion 4222b acts as a fulcrum point. Responsive to the elastic deformation of the support portion 4221 and the second deformation portion 4222b, the first deformation portion 4222a and the third deformation portion 4222c are moved radially inwardly. Inasmuch as the support portion 4221 is joined to the upper end portion of the outer circumferential surface of the shaft-fixed portion 423, it is possible to increase the axial length of the first deformation portion 4222a and the second deformation portion 4222b. Thanks to the increase in the length of the second deformation portion 4222b, it becomes possible to deform the second deformation portion 4222b with a small force. Therefore, it is possible to axially downwardly move the disk holding portion 421 with ease by applying a small force to the disk holding portion 421 in an axially downward direction. As a result, it is possible to provide a chucking device operable with a reduced disk mounting force, a brushless motor provided with the chucking device and a disk drive apparatus equipped with the brushless motor.

Seeing that the curved surface portion 4221a is formed in the radially inward region of the lower surface of the support portion 4221, the portion serving as the fulcrum point of the support portion 4221 has an increased axial thickness and becomes a smoothly curved surface. This makes it possible to avoid concentration of a stress on the fulcrum point. Therefore, it is possible to reduce the axial thickness of the remaining portions of the support portion 4221. As a result, the support portion 4221 is axially downwardly movable with a small force, which ensures that the disk holding portion 421 can be moved axially downwardly even when a small force is applied thereto. This results in a decrease in the disk mounting force. In addition, it is possible to prevent the support portion 4221 from undergoing plastic deformation such as fracture or the like, even when the disk 60 is repeatedly mounted to and demounted from the chucking device 4 several times. Therefore, it is possible to provide a highly reliable chucking device.

When the disk 60 is mounted to the chucking device 4, the inner circumferential surfaces of the planar portions 4214 of the disk holding portion 421 make sliding movement with the outer circumferential surface of the cylinder portion 411 of the turntable 41 and move axially downwardly. Lubricant exists in the radial gap between the inner circumferential surfaces of the planar portions 4214 and the outer circumferential surface of the cylinder portion 411. This makes it possible to reduce the frictional force which would be generated when the planar portions 4214 are axially moved relative to the cylinder portion 411. As a consequence, it is possible to provide a chucking device that can reduce the disk mounting force, while highly accurately centering the disk into alignment with the center axis J1.

Second Preferred Embodiment of Brushless Motor

Next, a second preferred embodiment of the present brushless motor will be described with reference to FIG. 13, which is an axially-cut schematic section view showing the second preferred embodiment of the present brushless motor.

Figure 13:
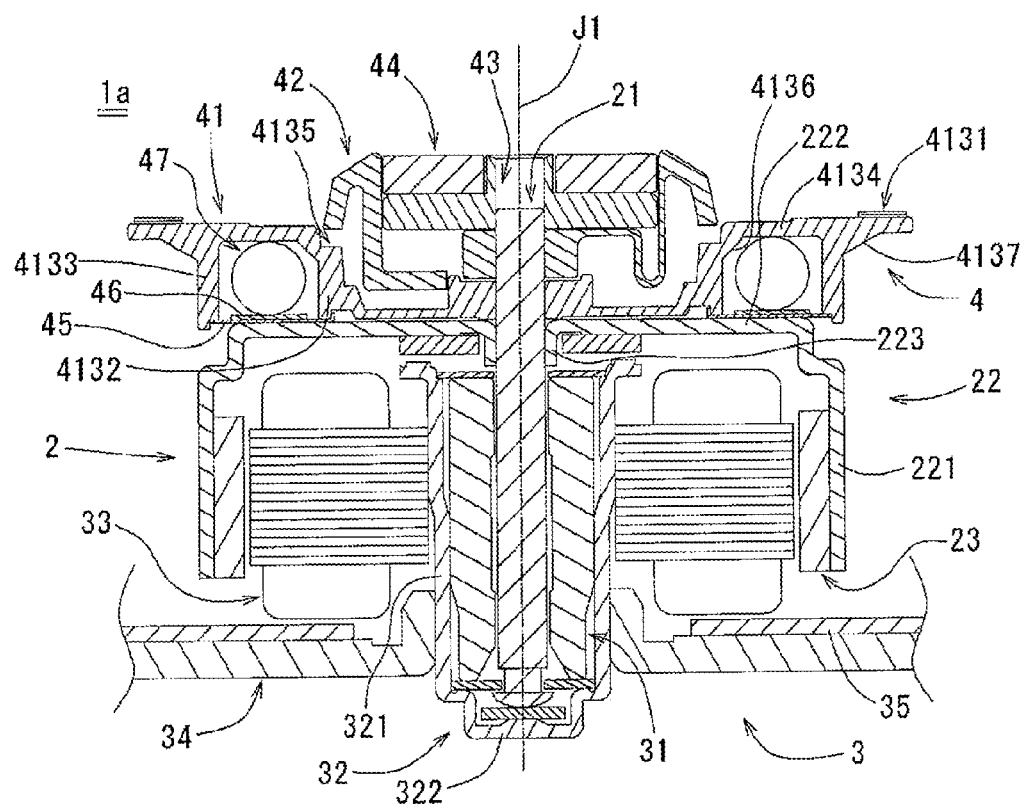
FIG. 13 is an axially-cut schematic section view showing another embodiment of a brushless motor in accordance with the present invention.

In FIG. 13, the same members and portions as those shown in FIG. 1 are designated by like reference numerals. No description will be offered on the same members and portions as those shown in FIG. 1. Hereinafter, description will proceed regarding the portions modified from those shown in FIG. 1 and the portions not described in connection with FIG. 1.

Referring to FIG. 13, the disk support part 413 of the turntable 41 of the chucking device 4a preferably includes a substantially cylindrical inner circumferential wall portion 4132 joining to the radial extension portion 412 and extending in an axial direction, a substantially cylindrical outer circumferential wall portion 4133 formed radially outwardly of the inner circumferential wall portion 4132 in a concentric relationship with the latter, and a substantially annular connecting portion 4134 that radially interconnects the upper portions of the inner and outer circumferential wall portions 4132 and 4133.

An annular recess portion 4135 for receiving the axial lower end of the disk holding portion 421 of the cone 42 is defined by the upper surface of the inner circumferential wall portion 4132 and the inner circumferential surface of the connecting portion 4134. An annular slanting surface 4136 inclined radially inwardly and axially downwardly is formed between the outer circumferential surface of the inner circumferential wall portion 4132 and the lower surface of the connecting portion 4134. Despite formation of the annular recess portion 4135, the annular slanting surface 4136 helps eliminate the possibility that the cross-sectional area between the annular recess portion 4135 and the annular slanting surface 4136 grows extremely smaller than that of the remaining portions. This assists in improving the flowability of a resin material when injection-molding the turntable 41. As a result, it is possible to reduce occurrence of molding defects in the turntable 41.

The connecting portion 4134 extends radially outwardly of the outer circumferential wall portion 4133. A disk support portion 4131 is formed in the outer periphery region of the connecting portion 4134. The lower surface of the connecting portion 4134 lying radially inwardly of the outer circumferential wall portion 4133 is joined to the outer circumferential surface of the outer circumferential wall portion 4133 by a sloping surface 4137 inclined radially outwardly and axially upwardly.

A substantially annular plate 45 made of a metal plate is fixed to the inner circumferential wall portion 4132 and the outer circumferential wall portion 4133 so that it can radially interconnect the lower ends of the inner and outer circumferential wall portions 4132 and 4133. The plate 45 includes a cylinder portion 451 fixed to the inner circumferential surface of the inner circumferential wall portion 4132 and a planar portion 452 extending radially outwardly from the cylinder portion 451 and remaining in contact with the lower surfaces of the inner and outer circumferential wall portions 4132 and 4133. A resin-made annular seat 46 is fixed to the radial extension region of the planar portion 452 between the inner circumferential wall portion 4132 and the outer circumferential wall portion 4133. A plurality of steel balls 47 for correcting the rotational balance of the rotor unit 2 of the brushless motor 1 is arranged on the upper surface of the seat 46. This makes it possible to reduce vibration even when the brushless motor 1 is rotated at a high speed.

Third Preferred Embodiment

Overall Structure of Brushless Motor

A third preferred embodiment of a brushless motor according to the present invention will now be described with reference to FIG. 14, which is an axially-cut schematic section view showing the preferred embodiment of the present brushless motor.

Figure 14:
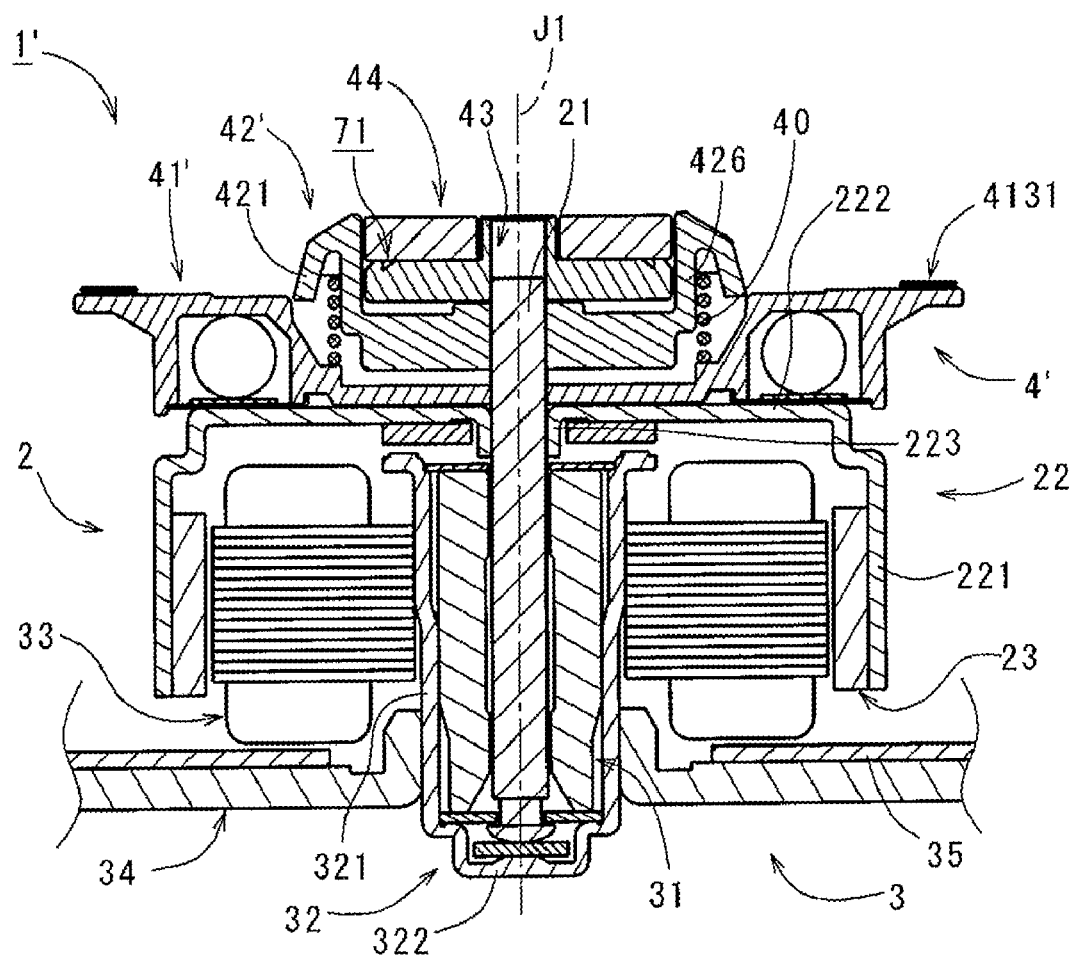
FIG. 14 is an axially-cut schematic section view showing one preferred embodiment of a brushless motor according to the present invention.

Referring to FIG. 14, a brushless motor 1' preferably includes a motor device, which has a rotor unit 2 rotatable about a specified central axis J1 and a stator unit 3 arranged to rotatably support the rotor unit 2, and a chucking device 4' arranged axially above the rotor unit 2. A disk with a central opening is removably attached to the chucking device 4'.

The rotor unit 2 and the stator unit 3 have the same configurations as those in the first preferred embodiment, and redundant descriptions thereof will be omitted.

(Structure of Chucking Device)

Figure 15:
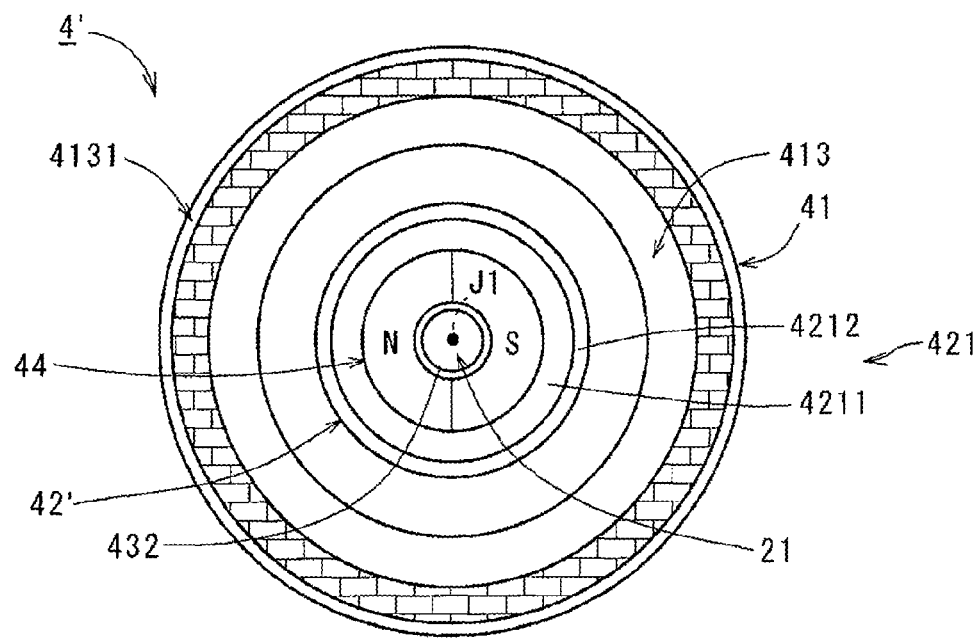
FIG. 15 is a schematic top plan view showing one preferred embodiment of a chucking device according to the present invention.

Next, the chucking device 4' according to the third preferred embodiment of the present invention will be described with reference to FIGS. 14 to 23. FIG. 15 is a top view of the chucking device 4'.

Referring to FIGS. 14 and 15 (or FIG. 20), the chucking device 4' preferably includes: a turntable 41, made of an injection-molded resin material, arranged on an upper surface of the cover portion 222 of the rotor holder 22 and fixed to the shaft 21; a cone 42' arranged axially above the turntable 41, the cone 42' having a disk holding portion 421 arranged to make contact with a central opening of a disk (not shown), the cone 42' made of an injection-molded resin material; a yoke 43, made of a magnetic material, arranged axially above the cone 42' and fixed to the shaft 21; a substantially annular clamp magnet 44 fixed to an upper surface of the yoke 43; and a coil spring 40. The clamp magnet 44 is fixed to the upper surface of the yoke 43 by a magnetic attraction force acting between the clamp magnet 44 and the yoke 43 and an adhesive agent. Thus, the clamp magnet 44 is indirectly fixed to the shaft 21 through the yoke 43.

The coil spring 40 is arranged around the shaft 21 and vertically pinched between the turntable 41 and the cone 42'. In the brushless motor 1', the shaft 21 may be regarded as a component of the chucking device 4' that serves to hold the turntable 41.

An annular disk support portion 4131 made of rubber or the like is provided on the turntable 41 radially outwards of the cone 42'. The disk support portion 4131 has an upper surface that makes contact with a lower surface of the disk. Thus, the upper surface of the disk support portion 4131 serves as a support surface through which the disk is mounted to the chucking device 4'. Herein, the clamp magnet 44 of the present preferred embodiment is magnetized with two poles along a circumferential direction. The surface of the clamp magnet 44 is plated with nickel.

Figure 16:
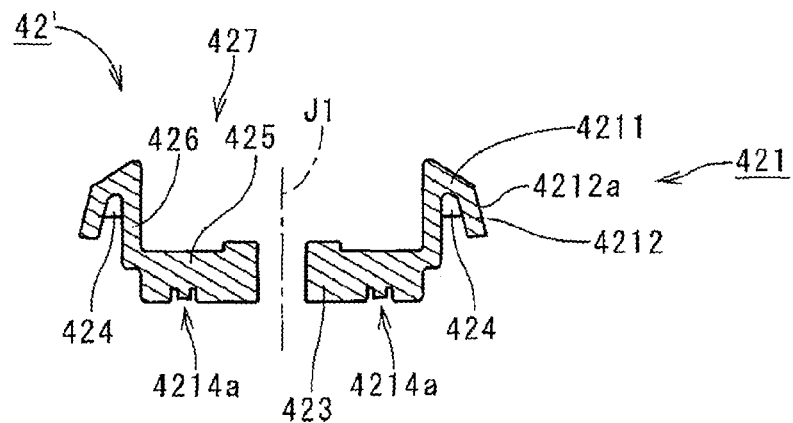
FIG. 16 is a section view illustrating a cone of the chucking device.

FIG. 16 is a section view illustrating the cone 42'. The cone 42' preferably includes an annular disk holding portion 421, a ring-shaped portion 425 extending perpendicularly to the central axis J1, and a circumferential wall portion 426 of cylindrical shape extending about the central axis J1. The ring-shaped portion 425 preferably includes a cylindrical sliding portion 423 arranged near the central axis J1. The shaft 21 is arranged inside the sliding portion 423 in such a state that the shaft 21 makes light contact with an inner surface of the sliding portion 423. During attachment and removal of the disk, the sliding portion 423 can make vertical sliding movement with respect to the shaft 21 using the elastic deformation of the coil spring 40.

The circumferential wall portion 426 extends upwards from the outer periphery of the ring-shaped portion 425. An accommodation space 427 for accommodating the yoke 43 and the clamp magnet 44 is defined inside the cone 42' by the ring-shaped portion 425 and the circumferential wall portion 426. In the present preferred embodiment, the circumferential wall portion 426 has a radial thickness of about 0.9 mm and the ring-shaped portion 425 has an axial thickness of about 1.0 mm. With the present chucking device 4', minute gaps are defined between the inner circumferential surface of the circumferential wall portion 426 and the outer circumferential surface of the yoke 43 and between the inner circumferential surface of the circumferential wall portion 426 and the outer circumferential surface of the clamp magnet 44, as can be seen in FIG. 1.

Referring again to FIG. 3, the disk holding portion 421 preferably includes a first slanting portion 4211 inclined radially outwards and axially downwards from the top end of the circumferential wall portion 426 and a second slanting portion 4212 formed radially outwards of the first slanting portion 4211 and inclined radially outwards and axially downwards. The central axis J1 and the first slanting portion 4211 make an acute angle which is greater than the angle made by the central axis J1 and the second slanting portion 4212.

The first slanting portion 4211 has an outer surface that makes contact with the lower edge of the central opening of the disk when the disk is mounted to the chucking device 4'. Then, the lower edge of the central opening of the disk is guided to the second slanting portion 4212 by the first slanting portion 4211.

The second slanting portion 4212 has an outer surface, i.e., a disk holding surface 4212a, which makes contact with the lower region of the inner circumferential surface of the central opening of the disk when the disk has been mounted to the chucking device 4'. The disk holding surface 4212a radially holds the disk in place.

Figure 17:
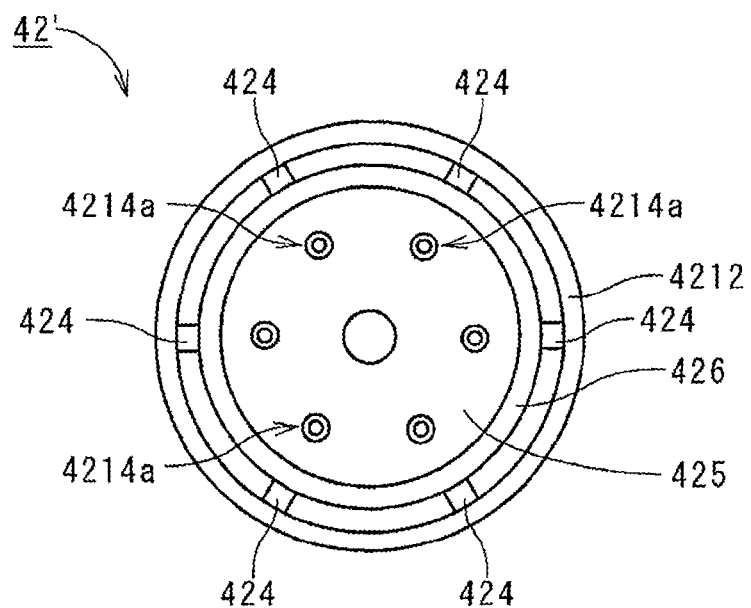
FIG. 17 is a bottom plan view of the cone.

FIG. 17 is a bottom view of the cone 42'. As shown in FIGS. 16 and 17, gate portions 4214a are provided on the lower surface of the ring-shaped portion 425 of the cone 42'. The gate portions 4214a are the vestiges of gates though which a resin material flows into a mold (not shown) during an injection-molding process. A plurality of ejector pins (not shown) for detaching the cone 42' from the mold comes into contact with the upper surface of the ring-shaped portion 425 shown in FIG. 3. The cone 42' as a molded product is separated from the mold by the ejector pins. Although the gate portions 4214a are provided on the lower surface of the ring-shaped portion 425 and the ejector pins are brought into contact with the upper surface of the ring-shaped portion 425 in the present preferred embodiment, it may be possible to provide the gate portions 4214a on the upper surface of the ring-shaped portion 425 and to bring the ejector pins into contact with the lower surface of the ring-shaped portion 425. The gate portions 4214a are provided in the ring-shaped portion 425 thicker than other portions of the cone 42'. This makes it possible to maintain the strength required to separate the gate portions 4214a and the cone 42' as a molded product from the mold in a mold releasing process.

As shown in FIGS. 16 and 17, ribs 424 are provided in a radial gap between the outer circumferential surface of the circumferential wall portion 426, the first slanting portion 4211 and the second slanting portion 4212 to interconnect them together. In the present preferred embodiment, the ribs 424 are circumferentially spaced apart at an interval of about 60° along the circumferential wall portion 426.

Figure 18:
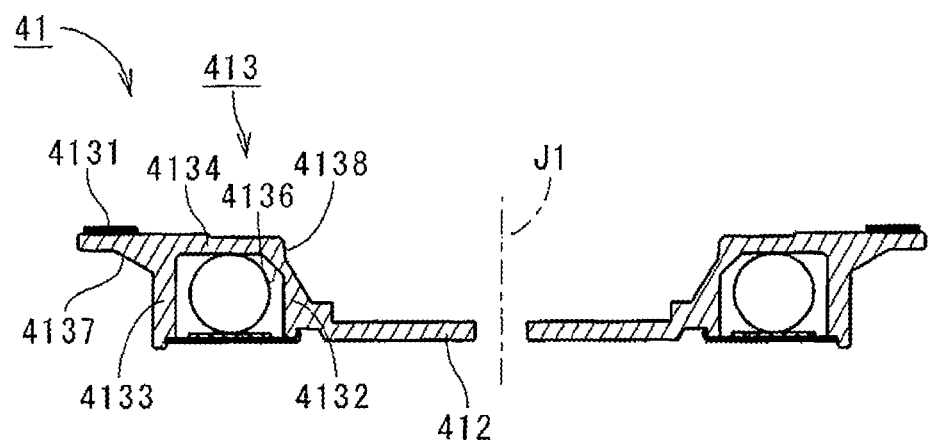
FIG. 18 is a section view illustrating a turntable of the chucking device.

FIG. 18 is a section view illustrating the turntable 41. The turntable 41 preferably includes a substantially planar radial extension portion 412 extending radially outwards and a disk support portion 413 provided radially outwards of the radial extension portion 412 to support the disk.

The disk support portion 413 preferably includes: an axially-extending inner circumferential wall portion 4132 of substantially cylindrical shape connected to the radial extension portion 412, an outer circumferential wall portion 4133 of substantially cylindrical shape provided radially outwards of the inner circumferential wall portion 4132 in a concentric relationship with the latter; and a substantially annular connecting portion 4134 arranged to radially interconnect the upper portions of the inner circumferential wall portion 4132 and the outer circumferential wall portion 4133.

An annular oblique surface 4136 inclined radially inwards and axially downwards is defined between the inner circumferential surface of the inner circumferential wall portion 4132 and the lower surface of the connecting portion 4134. A cylindrical surface 4138 extending parallel to the central axis J1 is defined radially inwards of the annular oblique surface 4136. As will be set forth below, the tip end of the disk holding portion 421 of the cone 42' is positioned inside the cylindrical surface 4138 when a disk is held in the cone 42' as in FIG. 1. Presence of the annular oblique surface 4136 in the present chucking device 4' prevents the portion between the annular oblique surface 4136 and the cylindrical surface 4138 from becoming excessively thinner than other portions of the turntable 41. This helps enhance the flowability of a resin material when injection-molding the turntable 41, thereby reducing the likelihood of defective molding of the turntable 41.

The connecting portion 4134 extends radially outwards beyond the outer circumferential wall portion 4133 and terminates at an outer peripheral portion on which the disk support portion 4131 lies. The lower surface of the connecting portion 4134 located radially outwards of the outer circumferential wall portion 4133 is joined to the outer circumferential surface of the outer circumferential wall portion 4133 by an oblique surface 4137 inclined radially outwards and axially upwards.

Figure 19:
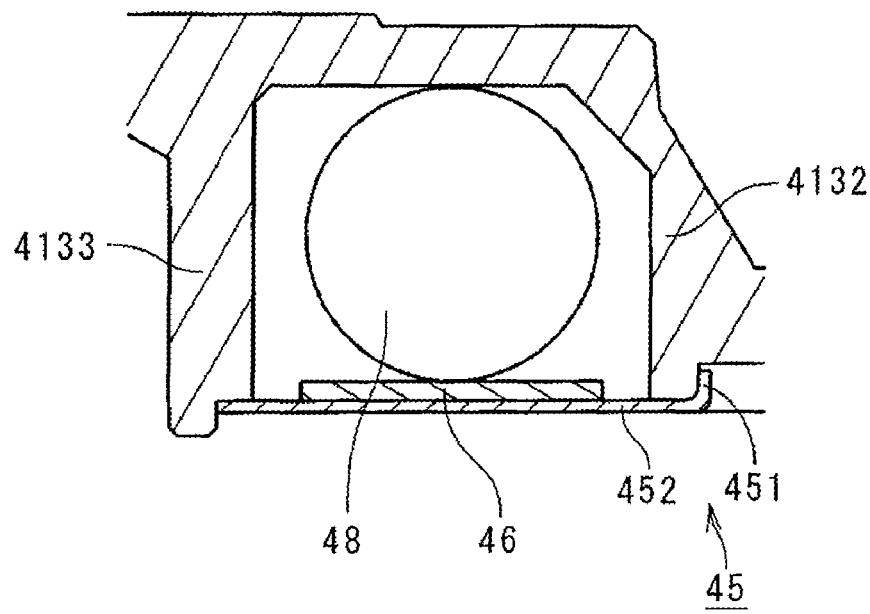
FIG. 19 is a partially enlarged section view of the turntable.

Referring to FIG. 19, a substantially annular metal plate 45 is fixed to the turntable 41 so that it can radially interconnect the lower end of the inner circumferential wall portion 4132 and the lower end of the outer circumferential wall portion 4133. The plate 45 preferably includes a cylinder portion 451 fixed to the inner circumferential surface of the inner circumferential wall portion 4132 and a planar portion 452 extending radially outwards from the cylinder portion 451, the planar portion 452 making contact with the lower surface of the inner circumferential wall portion 4132 and the lower surface of the outer circumferential wall portion 4133. A resin-made annular sheet 46 is fixed to the planar portion 452 in a radial gap between the inner circumferential wall portion 4132 and the outer circumferential wall portion 4133. A plurality of steel balls 48 for correcting the rotational balance of the rotor unit 2 in the brushless motor 1' is arranged on the upper surface of the sheet 46. This makes it possible to reduce vibration even when the brushless motor 1' is rotated at a high speed.

Figure 20:
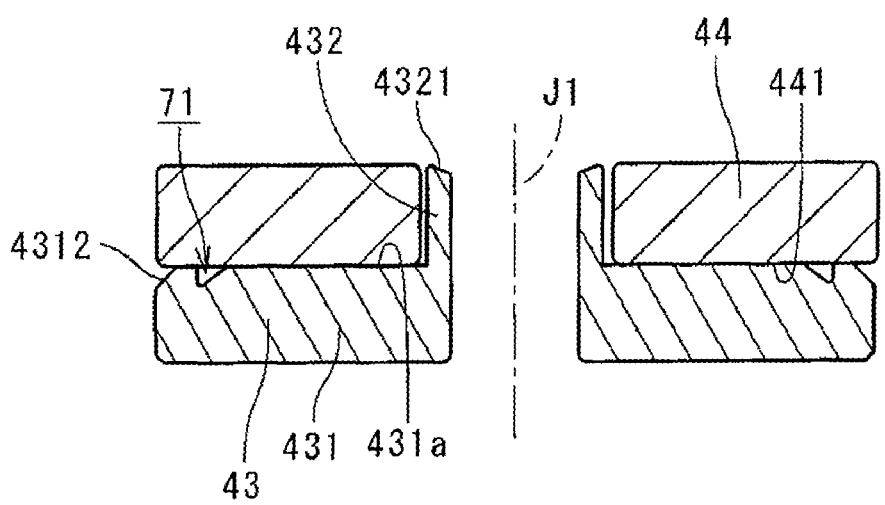
FIG. 20 is an axially-cut schematic section view showing a yoke and a clamp magnet coupled together, both of which form a part of the chucking device.

FIG. 20 is an axially-cut schematic section view showing the yoke 43 and the clamp magnet 44. Referring to FIG. 20, the yoke 43 is shaped by press forming and is provided with an inner circumferential surface fixed to the outer circumferential surface of the shaft 21. The yoke 43 preferably includes an annular flat portion 431 extending perpendicularly to the central axis J1 and a substantially cylindrical portion 432 extending axially upwards from the radial inner region of the upper surface of the flat portion 431. The cylindrical portion 432 has an inner circumferential surface whose diameter is equal to that of the inner circumferential surface of the flat portion 431. The clamp magnet 44 has a planar lower surface 441 perpendicular to the central axis J1. The inner circumferential surface of the clamp magnet 44 is radially spaced apart from the outer circumferential surface of the cylindrical portion 432. At the upper end of the cylindrical portion 432, there is defined an oblique guide surface 4321 whose diameter gets smaller axially downwards.

Figure 21:
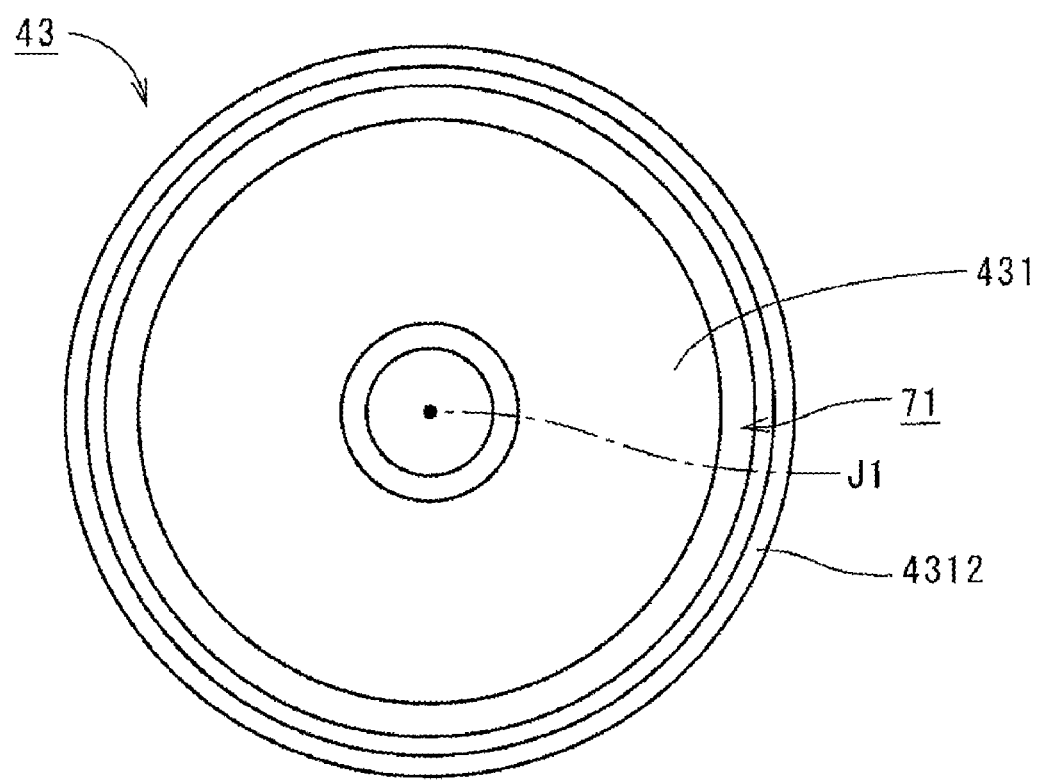
FIG. 21 is a plan view of the yoke.

FIG. 21 is a top view of the yoke 43. As shown in FIGS. 20 and 21, an axially downwardly depressed recess 71 is defined on the upper surface of the flat portion 431 near the outer circumferential surface of the latter. The recess 71 extends annularly about the central axis J1. An oblique surface 4312 inclined radially outwards and axially downwards is defined between the upper surface and outer circumferential surface of the flat portion 431.

Figure 22:
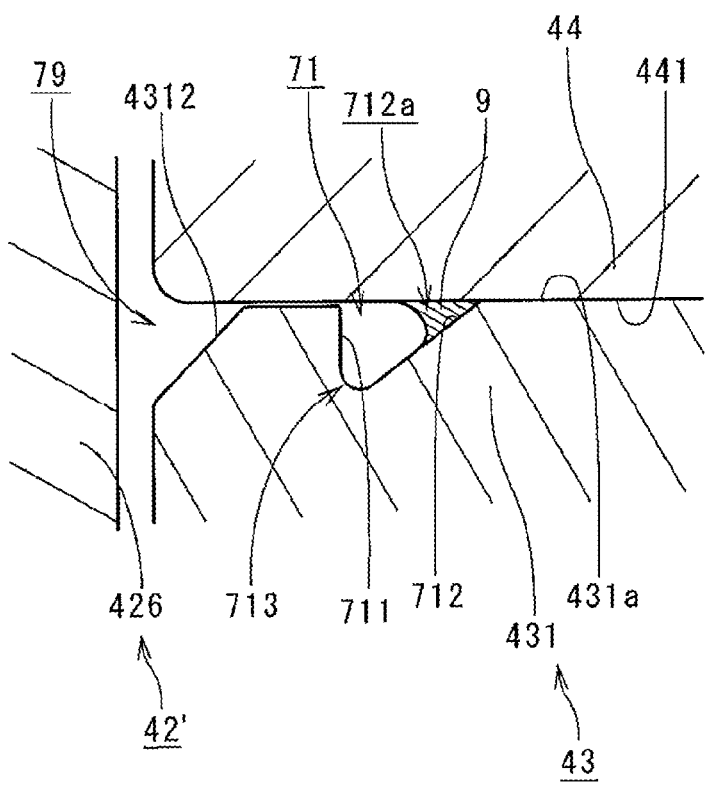
FIG. 22 is an enlarged view illustrating a recess of the yoke and its vicinities.

FIG. 22 is an enlarged view illustrating the recess 71 of the yoke 43 and its vicinities. The recess 71 preferably includes a radial outer wall 711 parallel to the central axis J1 and a radial inner wall 712 inclined axially upwards and radially inwards. In the following description, the radial outer wall 711 will be referred to as "first side wall 711" and the radial inner wall 712 as "second side wall 712". The recess 71 further includes a bottom portion 713 defined between the first side wall 711 and the second side wall 712. The distance between the bottom portion 713 of the recess 71 and the lower surface 441 of the clamp magnet 44 is equal to, e.g., about 0.2 mm.

A tapering gap 712a whose width gets gradually increased radially outwards is defined between the lower surface 441 of the clamp magnet 44 and the second side wall 712 of the recess 71. In the outer edge portion of the yoke 43, a tapering gap 79 whose width gets gradually increased radially outwards is defined by the lower surface 441 of the clamp magnet 44 and the oblique surface 4312 of the yoke 43. In the following description, the tapering gap 79 will be referred to as "outer peripheral gap 79".

The outer circumferential surface of the clamp magnet 44 is substantially flush with the outer circumferential surface of the flat portion 431. By attaching the clamp magnet 44 on the basis of the outer diameter of the flat portion 431, it is possible to prevent the outer circumferential surface of the clamp magnet 44 from making contact with the inner circumferential surface of the circumferential wall portion 426 of the cone 42'. This makes it possible to avoid a problem of the disk holding portion 421 being unable to move axially downwards or a problem of the disk holding portion 421 being deformed, which would occur when the clamp magnet 44 makes contact with the cone 42'. As a result, it is possible to provide a highly reliable chucking device and a brushless motor provided with such a chucking device.

Figure 23:
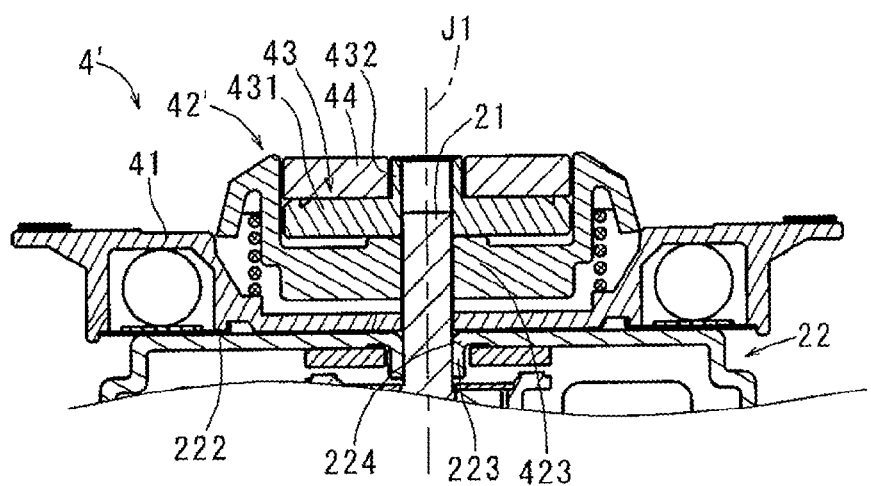
FIG. 23 is an enlarged view illustrating the chucking device shown in FIG. 14 and its vicinities.

Referring to FIG. 23, the inner cylinder portion 223 of the rotor holder 22 is curved axially downwards from the cover portion 222. Thus, a curved portion 224 is defined between the inner cylinder portion 223 and the cover portion 222.

The rotor holder 22 and the turntable 41 are fixed to the shaft 21, so that the rotor holder 22 and the turntable 41 can be accurately attached with respect to the central axis J1. Furthermore, the rotor holder 22 and the turntable 41 are axially spaced apart from each other. This makes it possible to prevent vibration of the chucking device 4' with respect to the central axis J1, which would be caused by the contact between the axially neighboring members. Accordingly, the respective members are accurately attached with respect to the central axis J1.

The lower surface of the flat portion 431 of the yoke 43 is opposed to the upper surface of the sliding portion 423 of the cone 42' with an axial gap left therebetween. The upper end extension of the cylindrical portion 432 of the yoke 43 extends axially upwards beyond the upper end surface of the shaft 21.

The cone 42' and the yoke 43 are fixed to the shaft 21, so that the cone 42' and the yoke 43 can be accurately attached with respect to the central axis J1. Furthermore, the cone 42' and the yoke 43 are axially spaced apart from each other. This makes it possible to prevent vibration of the chucking device 4' with respect to the central axis J1, which would be caused by the contact between the axially neighboring members. Accordingly, the respective members are accurately attached with respect to the central axis J1.

(Operation of Chucking Device During Disk Mounting Process)

Figure 24:
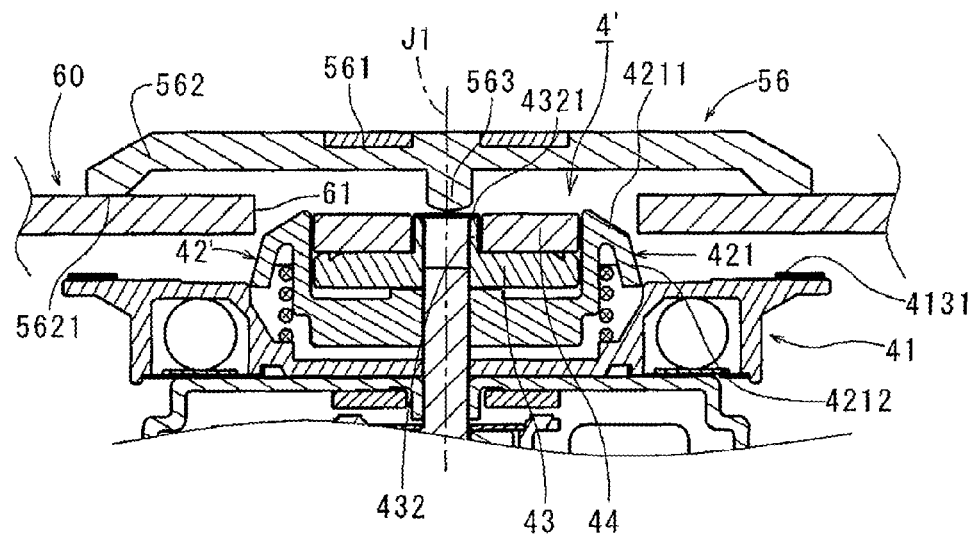
FIG. 24 is an axially-cut schematic section view depicting a state that a disk is being mounted to the present chucking device.
Figure 25:
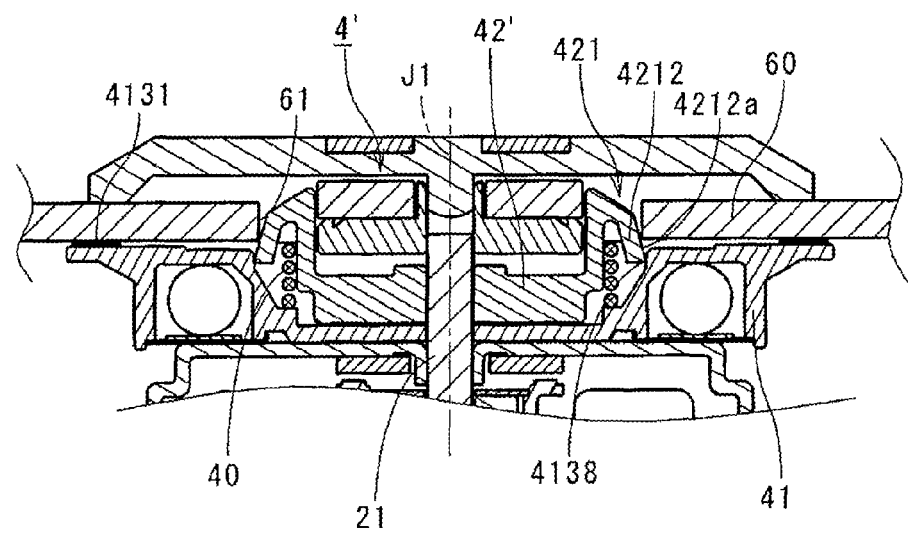
FIG. 25 is an axially-cut schematic section view depicting a state that the disk has been mounted to the chucking device.

Next, the operation of the cone 42' during the process of mounting the disk 60 to the chucking device 4' will be described with reference to FIGS. 24 and 25. FIG. 24 is an axially-cut schematic section view depicting a state that the disk 60 begins to make contact with the chucking device 4'. FIG. 25 is an axially-cut schematic section view depicting a state that the disk 60 has been mounted to the chucking device 4'.

Referring to FIG. 24, a clamp member 56 is arranged on the upper surface of the disk 60. The clamp member 56 preferably includes a magnetic clamp yoke 561 attracted to the clamp magnet 44, a resin-made pressing portion 562 integrally formed with the clamp yoke 561 and arranged to press the upper surface of the disk 60 and a centering protrusion 563 extending axially downwards from the pressing portion 562 in a substantially coaxial relationship with the central axis J1, the pressing portion 562 and the centering protrusion 563 being formed in a single unit. The pressing portion 562 has an annular disk contact surface 5621 that makes contact with the upper surface of the disk 60. The diameter of the disk contact surface 5621 is substantially the same as the diameter of the disk support portion 4131 of the turntable 41.

The central opening 61 of the disk 60 comes into contact with the first slanting portion 4211 of the cone 42'. The central opening 61 of the disk 60 is guided toward the second slanting portion 4212 by the first slanting portion 4211. Thus, the center of the central opening 61 is substantially aligned with the central axis J1.

The clamp yoke 561 of the clamp member 56 is magnetically attracted by the clamp magnet 44. At this time, the centering protrusion 563 is inserted into the cylindrical portion 432 under the guidance of the guide surface 4321 of the cylindrical portion 432 of the yoke 43, thereby centering the centering protrusion 563 into alignment with the central axis J1. Since the centering protrusion 563 is smoothly guided into alignment with the central axis J1 by the guide surface 4321, it is possible to reduce the disk mounting force.

Referring to FIG. 25, the coil spring 40 is elastically deformed so that the upper portion thereof can be displaced downwards. The cone 42' is moved downwards along the shaft 21. In the disk holding portion 421, the tip end of the second slanting portion 4212 is positioned inside the cylindrical surface 4138 of the turntable 41, and the second slanting portion 4212 is elastically deformed a little bit radially inwards. The disk 60 comes into contact with the disk support portion 4131. The disk 60 is pinched between the clamp member 56 and the disk support portion 4131 and is fixed against vertical movement. In a state that the center of the central opening 61 is aligned with the central axis J1, the disk holding surface 4212a of the second slanting portion 4212 accurately holds the disk 60 in the direction perpendicular to the central axis J1. This prevents the disk 60 from making radial movement during rotation of the brushless motor 1'.

(Assembling Process of Chucking Device)

Figure 26:
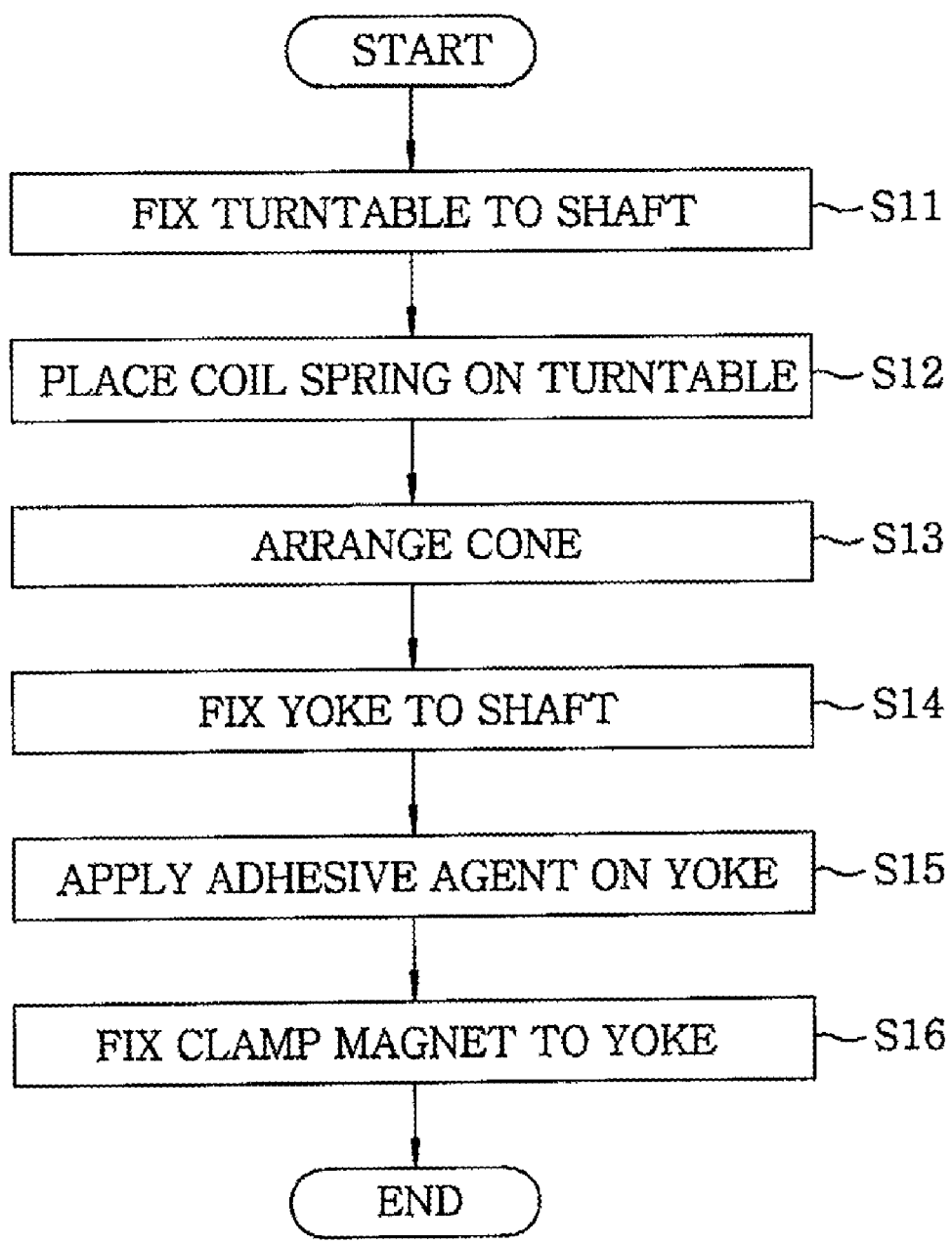
FIG. 26 is a flowchart illustrating an assembling process of the chucking device.
Figure 27:
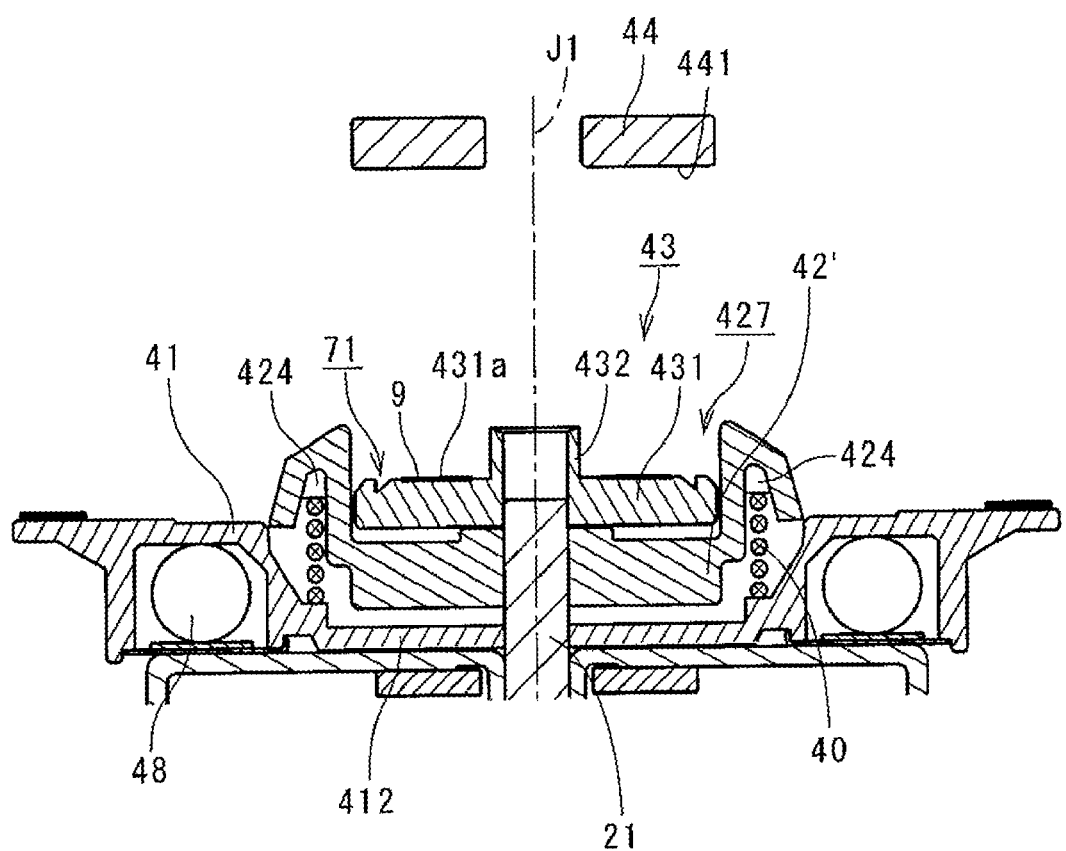
FIG. 27 is a view depicting the chucking device under an assembling operation.

FIG. 26 is a flowchart illustrating an assembling process of the chucking device 4'. First, as illustrated in FIG. 27, the turntable 41 provided with the steel balls 48 is fitted to the shaft 21 from above and fixed thereto (step S11). The shaft 21 is already attached to the rotor unit 2 and the stator unit 3. The coil spring 40 is placed on the radial extension portion 412 of the turntable 41 (step S12).

The cone 42' is fitted to the shaft 21 from above in a state that the coil spring 40 and the cone 42' are opposed to each other in the direction parallel to the central axis J1 (step S13). The yoke 43 is inserted into the accommodation space 427 of the cone 42' from above. The lower extension of the flat portion 431 of the yoke 43 is fitted and fixed to the upper end extension of the shaft 21 (step S14).

An adhesive agent 9 is applied on an annular area 431a of the upper surface of the flat portion 431. The annular area 431a is defined radially inwards of the recess 71 to extend perpendicularly to the central axis J1. The annular area 431a will be referred to as "application area 431a" herein below. The clamp magnet 44 magnetized is fitted to the cylindrical portion 432 of the yoke 43 from above while bringing the axis of the clamp magnet 44 into alignment with the central axis J1. The clamp magnet 44 is strongly brought into contact with the flat portion 431 of the yoke 43 by the magnetic attraction force acting between the clamp magnet 44 and the yoke 43. Then, the clamp magnet is fixed to the upper surface of the yoke 43 by the adhesive agent 9 (step S16).

At this time, the adhesive agent 9 is spread radially inwards and outwards through between the application area 431a of the yoke 43 and the lower surface 441 of the clamp magnet 44. When the adhesive agent 9 is spread radially outwards from the application area 431a, it is held in the tapering gap 712a of the recess 71 by a capillary force as can be seen in FIG. 22. As a consequence, at least a part of the adhesive agent 9, usually most of the adhesive agent 9, is applied on the application area 431a. In this manner, the adhesive agent 9 is restrained from flowing out of the application area 431a of the yoke 43. This helps prevent reduction in the bonding strength between the yoke 43 and the clamp magnet 44.

Figure 28:
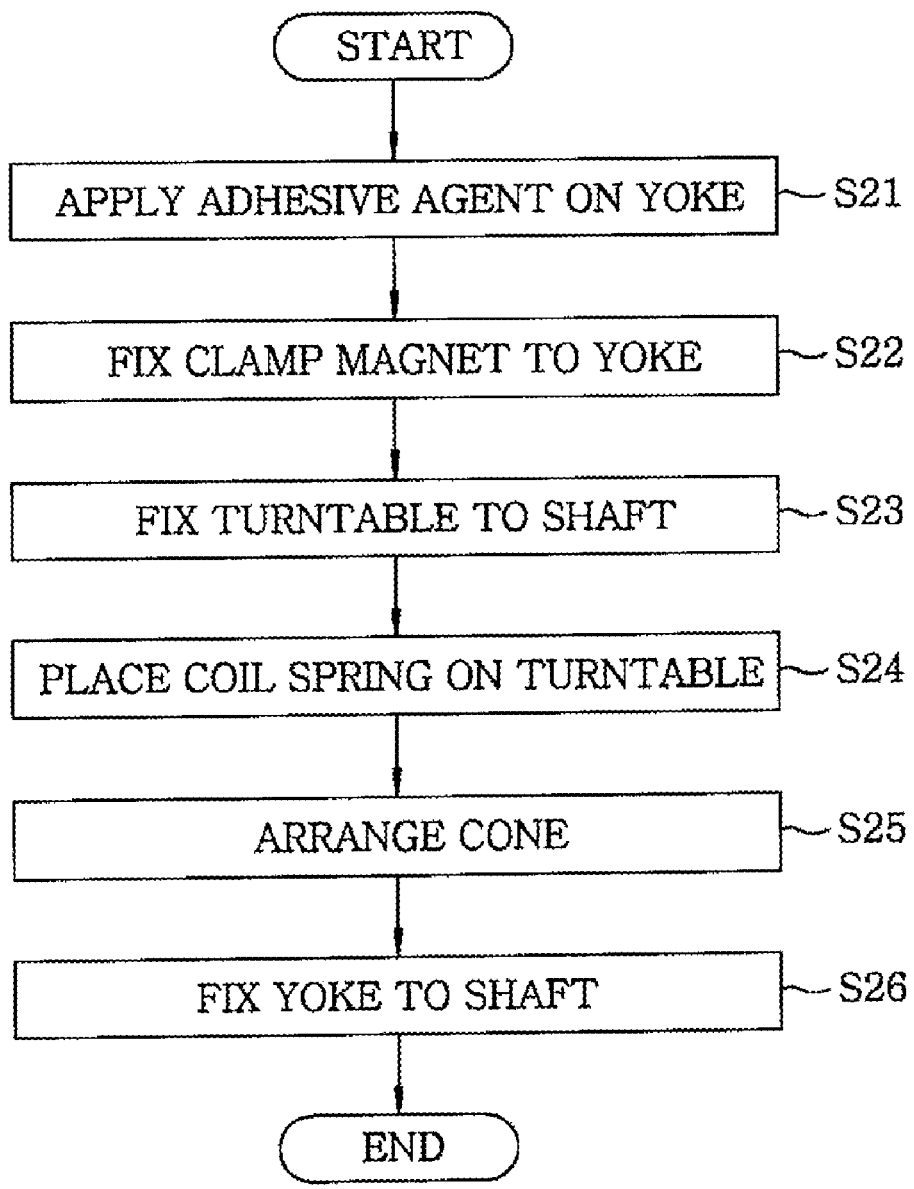
FIG. 28 is a flowchart illustrating another assembling process of the chucking device.

FIG. 28 is a flowchart illustrating another assembling process of the chucking device. In the assembling process illustrated in FIG. 28, the adhesive agent 9 is first applied on the application area 431a of the yoke 43 (step S21). Then, the clamp magnet 44 is fitted to the cylindrical portion 432 from above. The clamp magnet 44 is strongly brought into contact with the flat portion 431 of the yoke 43 by the magnetic attraction force acting between the clamp magnet 44 and the yoke 43. Then, the clamp magnet 44 is fixed to the upper surface of the yoke 43 by the adhesive agent 9 (step S22).

The turntable 41 is fitted to the shaft 21 from above and fixed thereto (step S23). The coil spring 40 is placed on the radial extension portion 412 of the turntable (step S24). The cone 42' is fitted to the shaft 21 from above (step S25). The yoke 43 and the clamp magnet 44 are inserted into the accommodation space 427 of the cone 42' from above. The lower extension of the flat portion 431 of the yoke 43 is fitted and fixed to the upper end extension of the shaft 21 (step S26).

The assembling order may be suitably changed if the circumstances permit.

With the first preferred embodiment described above, the angle between the first side wall 711 of the recess 71 and the central axis J1 is smaller than the angle between the second side wall 712 and the central axis J1. In other words, the angle between the first side wall 711 of the recess 71 and the lower surface 441 of the clamp magnet is greater than the angle between the second side wall 712 and the lower surface 441. Therefore, even when the adhesive agent 9 overflows from the tapering gap 712a, the force acting on the adhesive agent 9 radially inwards in the tapering gap 712a remains greater than the force acting on the adhesive agent 9 radially outwards in between the first side wall 711 and the clamp magnet 44. This restrains the adhesive agent 9 from moving radially outwards. As a result, the adhesive agent 9 is prevented from flowing radially outwards from between the flat portion 431 of the yoke 43 and the lower surface 441 of the clamp magnet 44.

If the adhesive agent 9 is moved radially outwards from the recess 71, it would be held in the outer peripheral gap 79. This reliably prevents the adhesive agent 9 from flowing out from between the yoke 43 and the clamp magnet 44. The adhesion property of the clamp magnet 44 is reduced if the clamp magnet 44 is plated with nickel. This means that a relatively large quantity of adhesive agent is required. Accordingly, the structure for preventing outflow of the adhesive agent is particularly suitable in using the clamp magnet 44 plated with nickel.

In a typical chucking device having a small gap between the circumferential wall portion of a cone and the flat portion of a yoke, the sliding movement of the cone may be hindered even if a small quantity of adhesive agent exists in the gap. It is impossible to increase the size of the cone and the gap, because the outer diameter of the cone is determined on the basis of the inner diameter of the disk. In the present chucking device 4', the adhesive agent 9 is prevented from flowing out toward the outer periphery of the flat portion 431. This makes it possible to get the flat portion 431 of the yoke 43 come close to the circumferential wall portion 426 of the cone 42'. As a result, the area of the flat portion 431 is increased so that the clamp magnet 44 with a large diameter can be attached to the yoke 43. This assists in increasing the clamp force acting between the clamp magnet 44 and the clamp member 56 when mounting the disk.

In the first preferred embodiment, the distance between the bottom portion 713 of the recess 71 and the lower surface 441 of the clamp magnet 44, i.e., the distance between the bottom portion 713 and the application area 431a, may be set equal to other values than 0.2 mm. In order for the recess 71 to sufficiently hold the adhesive agent 9 flowing out of the application area 431a, the distance is preferably set equal to or greater than 0.02 mm. With a view to provide the recess 71 with ease, the distance is preferably set equal to or smaller than 0.3 mm. More preferably, the distance is set in a range of from 0.15 mm to 0.25 mm. When the distance is equal to or smaller than 0.05 mm, the recess 71 serves also as a bonding surface.

In the present chucking device 4', a yoke produced by compressing and sintering a powder material may be used in place of the press-formed yoke 43. As a further alternative, the yoke may be produced through a cutting operation. Regardless of which method is used to produce the yoke, the distance between the bottom portion 713 of the recess 71 and the lower surface 441 of the clamp magnet 44 is set in a range of from 0.02 mm to 0.3 mm for the reasons stated above.

Fourth Preferred Embodiment

Figure 29:
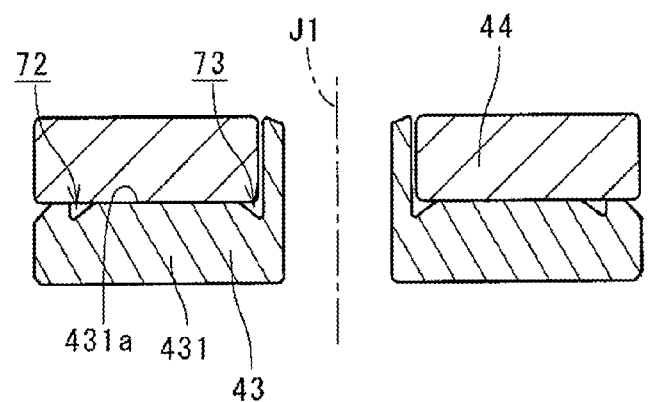
FIG. 29 is a section view showing a yoke and a clamp magnet of a chucking device according to a second preferred embodiment of the present invention.

FIG. 29 is a section view showing a yoke and a clamp magnet of a chucking device according to a second preferred embodiment of the present invention. The flat portion 431 of the yoke 43 preferably includes a first recess 72 and a second recess 73 positioned radially inwards of the first recess 72. Each of the first recess 72 and the second recess 73 extends in an annular shape about the central axis J1. The remaining portions of the yoke 43 have the same shape as the corresponding portions of the yoke 43 shown in FIG. 20. The same portions will be designated by like reference characters. The assembling process of the chucking device remains the same as described in respect of the first preferred embodiment (This holds true in other embodiments). The first recess 72 has the same cross-sectional shape as that of the recess 71 of the yoke 43 shown in FIG. 22. An application area 431a to be applied with an adhesive agent 9 is defined between the first recess 72 and the second recess 73.

Figure 30:
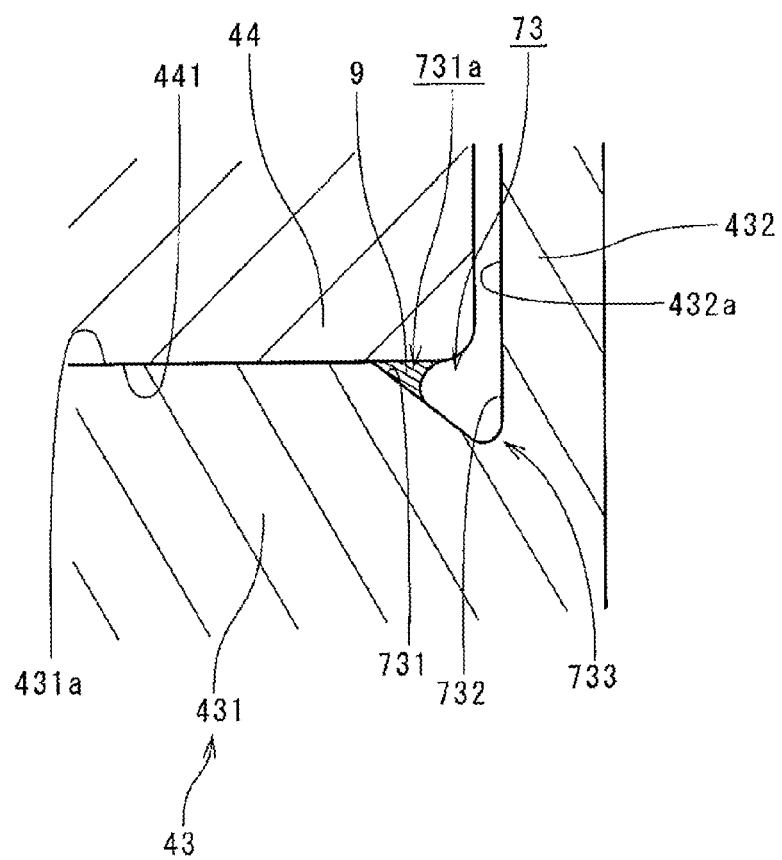
FIG. 30 is a partially enlarged section view illustrating the yoke and the clamp magnet.

FIG. 30 is a partially enlarged section view illustrating the second recess 73 shown in FIG. 29 and its vicinities. The second recess 73 of the yoke 43 preferably includes a first side wall 731 inclined radially outwards and axially upwards. A tapering gap 731a whose width gets gradually increased radially inwards is defined between the first side wall 731 and the lower surface 441 of the clamp magnet 44. The second recess 73 of the yoke 43 further includes a second side wall 732 defined radially inwards of the first side wall 731. The second side wall 732 is parallel to the central axis J1 shown in FIG. 29 and is joined to the outer circumferential surface 432a of the cylindrical portion 432. The second recess 73 further includes a bottom portion 733 defined between the first side wall 731 and the second side wall 732. In the second recess 73, the distance between the bottom portion 733 and the lower surface 441 of the clamp magnet 44 measured along the direction parallel to the central axis J1 is equal to, e.g., about 0.2 mm.

In order to fix the clamp magnet 44 to the yoke 43, the adhesive agent 9 is first applied on the application area 431a and then the clamp magnet 44 is fitted to the cylindrical portion 432 of the yoke 43 from above as illustrated in FIG. 27. In the yoke 43 shown in FIG. 30, the second recess 73 is provided to extend along the outer circumferential surface 432a of the cylindrical portion 432. This prevents the flat portion 431 from interfering with the radial inner edge of the lower surface 441 of the clamp magnet 44. In this manner, the second recess 73 serves as an escape portion by which to avoid the interference between the yoke 43 and the clamp magnet 44.

If the clamp magnet 44 comes into contact with the flat portion 431, the adhesive agent 9 is spread radially inwards and outwards through between the application area 431a of the yoke 43 and the lower surface 441 of the clamp magnet 44. When the adhesive agent 9 is spread radially inwards from the application area 431a, it is held in the tapering gap 731a of the second recess 73. As a consequence, the adhesive agent 9 is prevented from flowing upwards through between the outer circumferential surface 432a of the cylindrical portion 432 and the inner circumferential surface of the clamp magnet 44.

When the adhesive agent 9 is spread radially outwards from the application area 431a, it is held in the tapering gap 712a of the first recess 72 as can be seen in FIG. 22. Accordingly, the adhesive agent 9 is prevented from flowing radially outwards from between the flat portion 431 and the lower surface 441 of the clamp magnet 44.

With the second preferred embodiment described above, the angle between the second side wall 732 of the second recess 73 and the central axis J1 is smaller than the angle between the first side wall 731 and the central axis J1. In other words, the angle between the second side wall 732 of the second recess 73 and the lower surface 441 of the clamp magnet 44 is greater than the angle between the first side wall 731 and the lower surface 441. Therefore, even when the adhesive agent 9 overflows from the tapering gap 731a, the movement thereof is restrained by the second side wall 732. Thus, the adhesive agent 9 is held within the second recess 73. Further, with respect to the first recess 72, as in the recess 71 shown in FIG. 22, the inclination of the first side wall 711 of the first recess 72 with respect to the central axis J1 is smaller than the inclination of the second side wall 712 with respect to the central axis J1. That is, the angle between the first side wall 711 of the first recess 72 and the lower surface 441 of the clamp magnet 44 is greater than the angle between the second side wall 712 and the lower surface 441. Therefore, a radially inwardly acting force is strongly exerted on the adhesive agent 9, thereby restraining the adhesive agent 9 from moving radially outwards.

The distance between the bottom portion 713 of the second recess 73 and the lower surface 441 of the clamp magnet 44 may be set equal to other values than 0.2 mm. In order for the second recess 73 to sufficiently hold the adhesive agent 9 flowing out of the application area 431a, the distance is preferably set equal to or greater than 0.02 mm. With a view to provide the second recess 73 with ease, the distance is preferably set equal to or smaller than 0.3 mm. More preferably, the distance is set in a range of from 0.15 mm to 0.25 mm. This remains the same in the first recess 72 and in the first recess and the second recess of the preferred embodiments to be set forth below. When the distance is equal to or smaller than 0.05 mm, the first recess 72 and the second recess 73 serve also as bonding surfaces. When using a yoke produced by sintering or other methods, it remains the same that the distance between the bottom portions of the recesses 72 and 73 and the lower surface 441 of the clamp magnet 44 is set in a range of from 0.02 mm to 0.3 mm. This holds true in the preferred embodiments to be set forth below.

Fifth Preferred Embodiment

Figure 31:
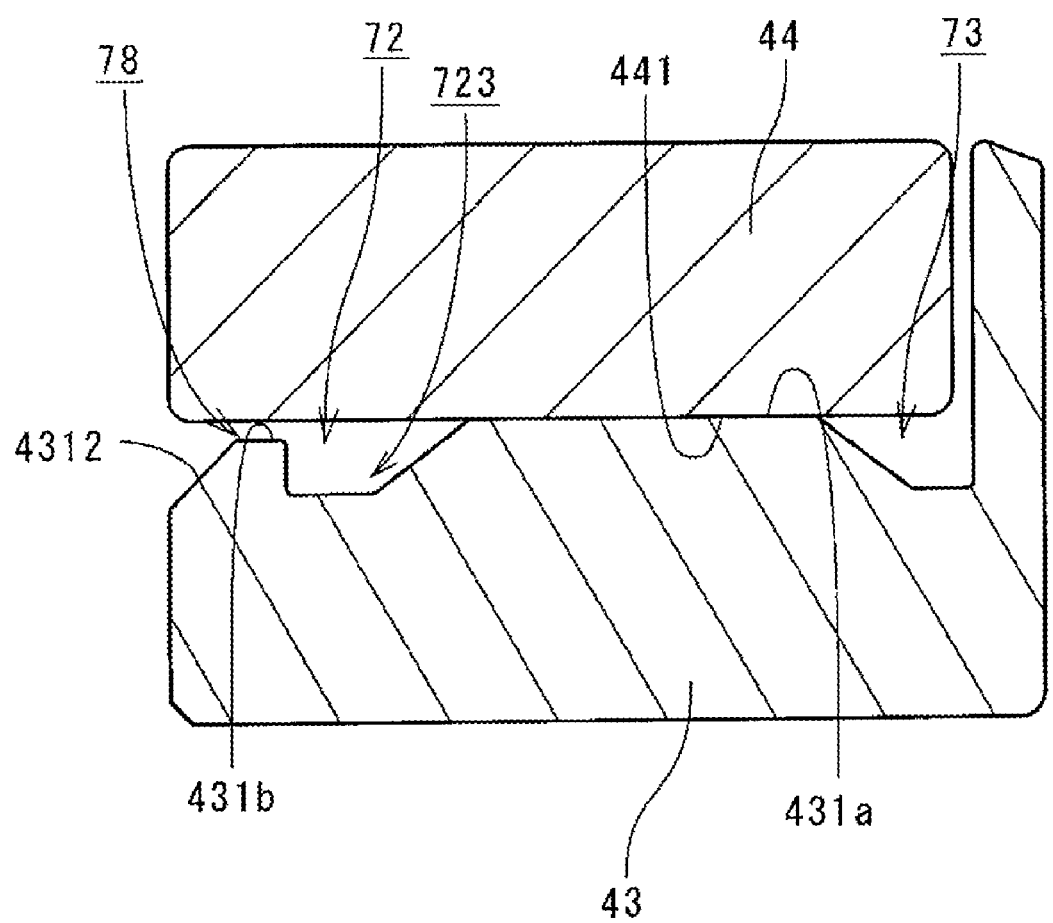
FIG. 31 is a section view showing a yoke and a clamp magnet of a chucking device according to a third preferred embodiment of the present invention.

FIG. 31 is a section view showing a yoke and a clamp magnet of a chucking device according to a third preferred embodiment of the present invention. In FIG. 31, the left halves of the yoke 43 and the clamp magnet 44 are shown in an enlarged scale. This remains the same in FIG. 32 to be described below. The yoke 43 preferably includes an annular region 431b defined between the first recess 72 and the oblique surface 4312. The annular region 431b is positioned lower than the application area 431a in the direction parallel to the central axis J1. The remaining portions of the yoke 43 are substantially identical in shape with the yoke 43 shown in FIG. 29.

In a state that the clamp magnet 44 is fixed to the yoke 43, there is defined a minute gap 78 between the annular region 431b positioned radially outwards of the first recess 72 and the lower surface 441 of the clamp magnet 44. The dimension of the minute gap 78 in the direction parallel to the central axis J1 is equal to, e.g., about 0.05 mm. The distance between the bottom portion 723 of the first recess 72 and the lower surface 441 of the clamp magnet 44 is equal to, e.g., about 0.2 mm.

In the third preferred embodiment, the adhesive agent 9 is held within the first recess 72 even if it flows radially outwards from the application area 431a in the course of fixing the clamp magnet 44. Furthermore, even when the adhesive agent 9 flows into the minute gap 78 from the first recess 72, the radial outward movement of the adhesive agent 9 within the minute gap 78 is restricted by a capillary force. Thus, the adhesive agent 9 is held within the minute gap 78. This reliably prevents the adhesive agent 9 from flowing out from between the yoke 43 and the clamp magnet 44.

The dimension of the minute gap 78 may be set equal to other values than 0.05 mm. In order to keep the adhesive agent 9 within the minute gap 78, the dimension of the minute gap 78 is set equal to or greater than 0.02 mm. With a view to get the adhesive agent 9 held within the minute gap 78 by the capillary force, the dimension of the minute gap 78 is set equal to or smaller than 0.1 mm. Needless to say, the dimension of the minute gap 78 is smaller than the distance between the bottom portion 723 of the first recess 72 and the lower surface 441 of the clamp magnet 44.

Fourth Preferred Embodiment

Figure 32:
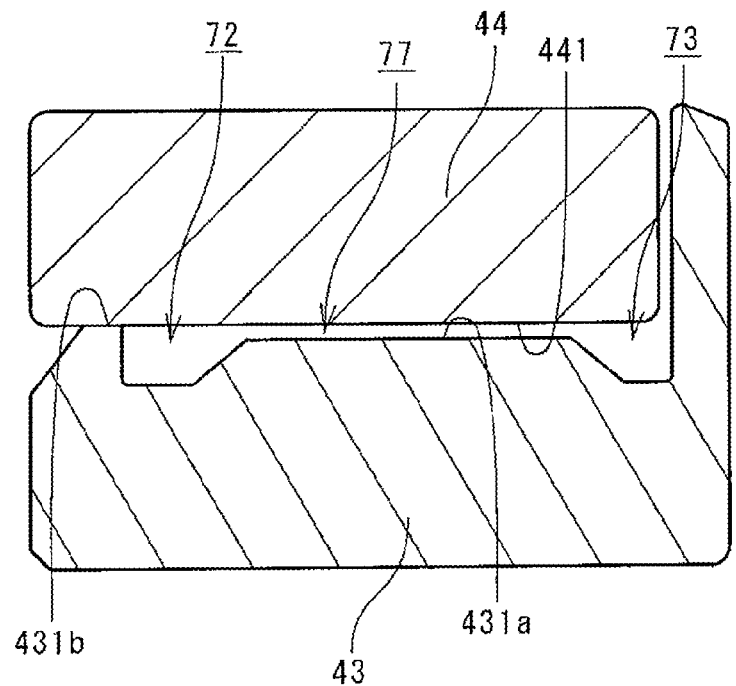
FIG. 32 is a section view showing a yoke and a clamp magnet of a chucking device according to a fourth preferred embodiment of the present invention.

FIG. 32 is a section view showing a yoke and a clamp magnet of a chucking device according to a fourth preferred embodiment of the present invention. In the yoke 43, the application area 431a is positioned lower than the annular region 431b in the direction parallel to the central axis J1. The remaining portions of the yoke 43 are identical in shape with the yoke 43 shown in FIG. 31. A minute gap 77 is defined between the application area 431a and the lower surface 441 of the clamp magnet 44. The dimension of the minute gap 77 is equal to, e.g., about 0.05 mm.

In the fourth preferred embodiment, even if a large quantity of adhesive agent 9 is applied on the application area 431a, the adhesive agent 9 is restrained from flowing radially inwards and outwards from the application area 431a in the course of fixing the clamp magnet 44. Thus, the adhesive agent 9 is held within the minute gap 77. This reliably prevents the adhesive agent 9 from flowing out from between the yoke 43 and the clamp magnet 44. The dimension of the minute gap 77 may be set equal to other values than 0.05 mm. In order to keep the adhesive agent 9 within the minute gap 77, the dimension of the minute gap 77 is set equal to or greater than 0.02 mm. With a view to have the yoke 43 and the clamp magnet 44 bonded together in the application area 431a, the dimension of the minute gap 77 is set equal to or smaller than 0.05 mm. The dimension of the minute gap 77 is smaller than the distance between the bottom portions of the first recess 72 and the second recess 73 and the lower surface 441 of the clamp magnet 44.

Figure 33:
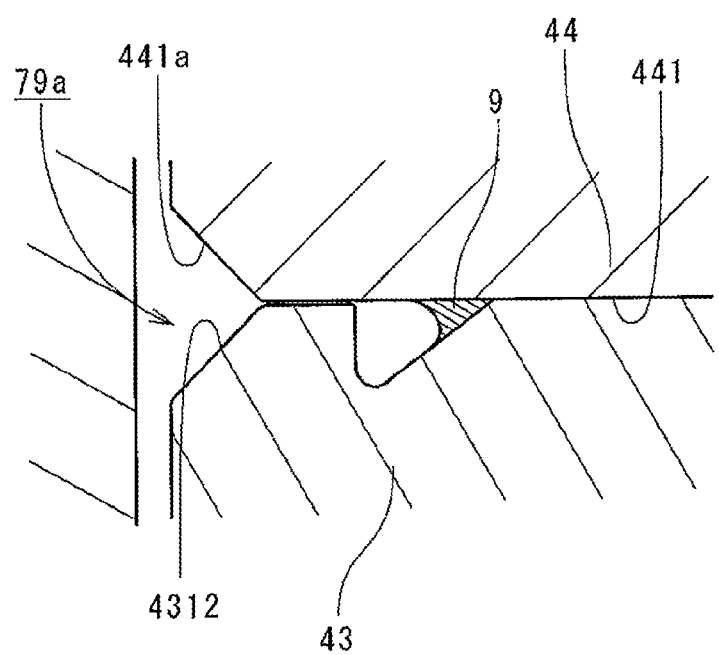
FIG. 33 is a view showing another example of the clamp magnet.
Figure 34:
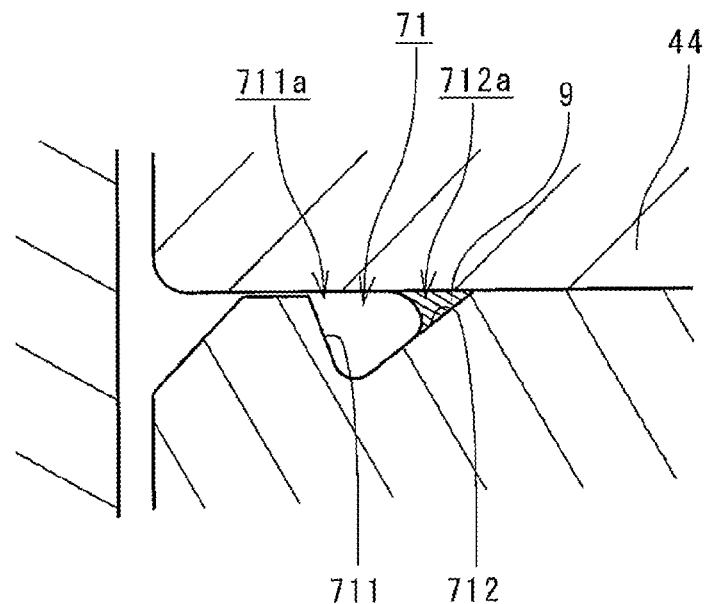
FIG. 34 is a view showing another example of the recess.

While certain preferred embodiments of the present invention have been described hereinabove, the present invention is not limited thereto but may be modified in many different forms without departing from the scope of the invention defined in the claims. For example, in the first preferred embodiment, the outer edge portion of the lower surface 441 of the clamp magnet 44 may be modified to an oblique surface 441*a* inclined radially outwards and axially upwards as illustrated in FIG. 33. This may be equally applicable to other embodiments. The oblique surface 441*a* is opposed to the oblique surface 4312 of the yoke 43 in the direction parallel to the central axis J1. An outer peripheral gap 79*a* whose width gets gradually increased radially outwards is defined between the oblique surfaces 441*a* and 4312. In the first preferred embodiment, the outer edge portion of the upper surface of the flat portion 431 may have a so-called "R"-shaped cross section which is smoothly curved radially outwards.

In the first preferred embodiment, the first side wall 711 may be inclined radially outwards and axially upwards, insofar as the angle between the first side wall 711 of the recess 71 and the central axis J1 is kept smaller than the angle between the second side wall 712 and the central axis J1, that is, insofar as the angle between the first side wall 711 of the recess 71 and the lower surface 441 of the clamp magnet 44 is greater than the angle between the second side wall 712 and the lower surface 441. Even in this case, the force acting on the adhesive agent 9 radially inwards in the tapering gap 712*a* is greater than the force acting on the adhesive agent 9 radially outwards in the gap 711*a* between the first side wall 711 and the clamp magnet 44. This restrains the adhesive agent 9 introduced into the recess 71 from moving radially outwards. This holds true in the first recess 72 of the yoke 43 employed in the second through fourth preferred embodiments.

In the second preferred embodiment, the second side wall 732 may be inclined radially inwards and axially upwards, insofar as the angle between the second side wall 732 of the second recess 73 and the central axis J1 is kept smaller than the angle between the first side wall 731 and the central axis J1, that is, insofar as the angle between the second side wall 732 of the second recess 73 and the lower surface 441 of the clamp magnet 44 is greater than the angle between the first side wall 731 and the lower surface 441. In the second recess 73, a radial outward force is strongly exerted on the adhesive agent 9, which restrains the adhesive agent 9 introduced into the second recess 73 from flowing upwards through between the outer circumferential surface 432*a* of the cylindrical portion 432 and the inner circumferential surface of the clamp magnet 44. This holds true for the second recess 73 shown in FIGS. 31 and 32.

Figure 35:
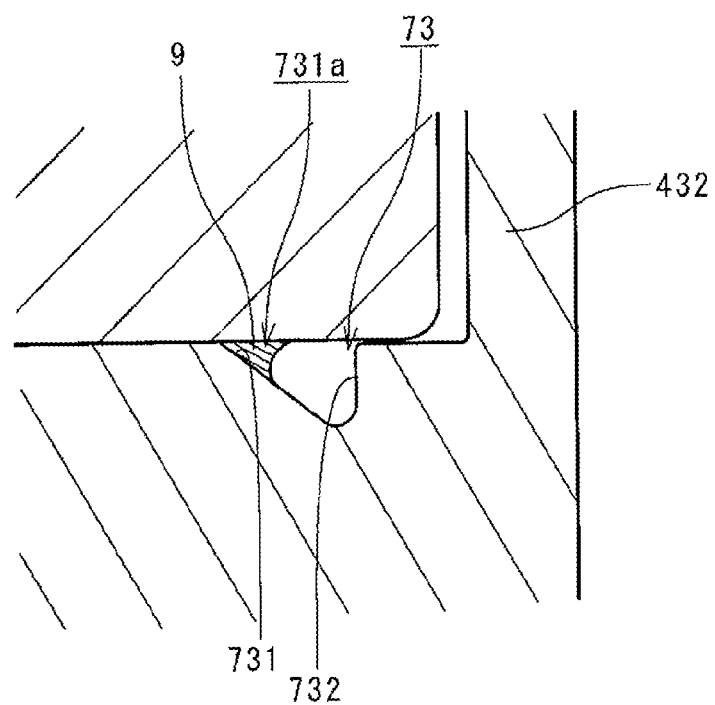
FIG. 35 is a view showing a further example of the recess.

In the second preferred embodiment, the second recess 73 may be provided radially outwards of the cylindrical portion 432 as illustrated in FIG. 35. Since the angle between the second side wall 732 and the central axis J1 is smaller than the angle between the first side wall 731 and the central axis J1, that is, since the angle between the second side wall 732 and the lower surface 441 of the clamp magnet 44 is greater than the angle between the first side wall 731 and the lower surface 441, a radial outward force is strongly exerted on the adhesive agent 9 within the tapering gap 731*a* even when the adhesive agent 9 is applied in a large quantity. This restrains the adhesive agent 9 from moving radially inwards.

In the first preferred embodiment, the application area 431*a* may be positioned higher than the annular region 431*b* as illustrated in FIG. 31. This ensures that the adhesive agent 9 flowing radially outwards from the recess 71 is held in the minute gap defined between the annular region 431*b* and the clamp magnet 44. Thus, the adhesive agent 9 is reliably prevented from flowing outwards from between the yoke 43 and the clamp magnet 44. In addition, the application area 431*a* may be positioned lower than the annular region 431*b* as illustrated in FIG. 32. This ensures that the adhesive agent 9 is held in the minute gap between the application area 431*a* and the clamp magnet 44.

In the fourth preferred embodiment shown in FIG. 32, the minute gap 77 may be provided in a portion of the application area 431*a*. For example, a circular shallow recess may be provided at the center of the application area 431*a* so that a minute gap can be defined between the recess and the clamp magnet 44. This holds true for the first and second preferred embodiments.

The steel balls 48 may be omitted from the turntable 41 unless the motor 1' suffers from increased vibration. In the chucking device 4', an elastic member made of a resin or the like may be used as the pressing unit for pressing the cone 42' upwards, in place of the coil spring 40. The cone 42' is not necessarily pressed upwards.

While certain embodiments of the present invention have been described hereinabove, the present invention is not limited thereto. Many changes or modifications may be made without departing from the scope of the claims.

For instance, although the sleeve 31 is used in the present embodiments to rotatably support the shaft 21, the present invention is not limited thereto. The brushless motor may be provided with a bearing mechanism arranged to rotatably support the shaft 21. For example, a ball bearing may be used in place of the sleeve 31. The optical pickup mechanism 52 of the disk drive apparatus 50 may be provided with a recording and reproducing unit that performs at least one of the tasks of optically recording and reproducing the disk 60.

The present invention is particularly suitable for use in a motor of a storage disk drive apparatus but may be used in a motor for other devices than the storage disk drive apparatus.

What is claimed is:

1. A chucking device for removably holding a disk with a central opening, comprising:
   a shaft coaxially arranged with a specified central axis;
   a turntable fixed to the shaft, the turntable including a disk support surface arranged to support the disk;
   a cone arranged axially above the turntable, the cone including a sliding portion arranged to make axial sliding movement with respect to the shaft and a disk holding portion having an annular disk holding surface inclined radially outwards and axially downwards;
   an annular yoke arranged above the sliding portion of the cone and fixed to the shaft; and
   a clamp magnet fixed to the yoke through an adhesive agent;
   wherein the yoke includes an upper surface having an annular recess defined in a concentric relationship with the central axis, at least a part of the adhesive agent being applied on a region of the upper surface existing radially inwards of the recess;
   the recess includes a radial outer wall parallel to the central axis or inclined radially outwards and axially upwards, and a radial inner wall inclined radially inwards and axially upwards; and
   the angle between the radial outer wall and the central axis is smaller than the angle between the radial inner wall and the central axis.

2. A chucking device for removably holding a disk with a central opening, comprising:
   a shaft coaxially arranged with a specified central axis;
   a turntable fixed to the shaft, the turntable including a disk support surface arranged to support the disk;
   a cone arranged axially above the turntable, the cone including a sliding portion arranged to make vertical sliding movement with respect to the shaft and a disk holding portion having an annular disk holding surface inclined radially outwards and axially downwards;

an annular yoke arranged above the sliding portion of the cone and fixed to the shaft; and a clamp magnet fixed to the yoke through an adhesive agent;

wherein the yoke includes an upper surface having an annular recess defined in a concentric relationship with the central axis, at least a part of the adhesive agent being applied on a region of the upper surface existing radially inwards of the recess;

the recess includes a radial outer wall parallel to the central axis or inclined radially outwards and axially upwards, and a radial inner wall inclined radially inwards and axially upwards; and the angle between the radial outer wall and a lower surface of the clamp magnet is greater than the angle between the radial inner wall and the lower surface of the clamp magnet.

3. The chucking device of claim 1 or 2, wherein the distance between the clamp magnet and the bottom portion of the recess is in a range of from 0.02 mm to 0.3 mm.

4. The chucking device of claim 1 or 2, wherein a gap is defined between a region of the upper surface of the yoke existing radially outwards of the recess and the clamp magnet.

5. The chucking device of claim 4, wherein the gap is smaller than the distance between the clamp magnet and the bottom portion of the recess and is in a range of from 0.02 mm to 0.1 mm.

6. The chucking device of claim 1 or 2, wherein a gap is defined between the region of the upper surface of the yoke existing radially inwards of the recess and the clamp magnet.

7. The chucking device of claim 6, wherein the gap is smaller than the distance between the clamp magnet and the bottom portion of the recess and is in a range of from 0.02 mm to 0.05 mm.

8. The chucking device of claim 1 or 2, wherein a gap is defined between the clamp magnet and an outer edge portion of the yoke, the gap being gradually increased as it goes radially outwards.

9. The chucking device of claim 1 or 2, wherein the upper surface of the yoke has an additional annular recess defined radially inwards of the recess in a concentric relationship with the central axis, at least a part of the adhesive agent being applied on a region existing between the recesses.

10. The chucking device of claim 9, wherein the additional recess includes a radial inner wall parallel to the central axis or inclined radially inwards and axially upwards, and a radial outer wall inclined radially outwards and axially upwards; and the angle between the radial inner wall of the additional recess and the central axis is smaller than the angle between the radial outer wall of the additional recess and the central axis.

11. The chucking device of claim 9, wherein the yoke is a member formed by press-forming;

the yoke includes a substantially cylindrical portion extending axially upwards from a radial inner end of the upper surface thereof; and the cylindrical portion has an outer circumferential surface joining to the radial inner wall of the additional recess.

12. The chucking device of claim 9, wherein the distance between the clamp magnet and the bottom portion of the additional recess is in a range of from 0.02 mm to 0.3 mm.

13. The chucking device of claim 1 or 2, wherein the yoke includes a substantially cylindrical portion extending axially upwards from a radial inner end of the upper surface thereof.

14. The chucking device of claim 1 or 2, wherein the clamp magnet is plated with nickel.

15. A brushless motor comprising: a chucking device, a rotor unit, and a stator unit, wherein the chucking device for removably holding a disk with a central opening comprises;

a shaft coaxially arranged with a specified central axis;

a turntable fixed to the shaft, the turntable including a disk support surface arranged to support the disk;

a cone arranged axially above the turntable, the cone including a sliding portion arranged to make axial sliding movement with respect to the shaft and a disk holding portion having an annular disk holding surface inclined radially outwards and axially downwards;

an annular yoke arranged above the sliding portion of the cone and fixed to the shaft; and a clamp magnet fixed to the yoke through an adhesive agent;

wherein the yoke includes an upper surface having an annular recess defined in a concentric relationship with the central axis, at least a part of the adhesive agent being applied on a region of the upper surface existing radially inwards of the recess; the recess includes a radial outer wall parallel to the central axis or inclined radially outwards and axially upwards, and a radial inner wall inclined radially inwards and axially upwards; and the angle between the radial outer wall and the central axis is smaller than the angle between the radial inner wall and the central axis, wherein the rotor unit includes a rotor magnet arranged to rotate about the central axis together with the shaft, the chucking device being attached to the rotor unit; and wherein the stator unit includes a stator arranged to generate magnetic fields toward the rotor magnet.

16. A disk drive apparatus, comprising:

a brushless motor arranged to rotate a disk;

an optical pickup mechanism, and a moving mechanism;

wherein the brushless motor comprising: a chucking device, a rotor unit, and a stator unit, wherein the chucking device for removably holding a disk with a central opening comprises:

a shaft coaxially arranged with a specified central axis;

a turntable fixed to the shaft, the turntable including a disk support surface arranged to support the disk;

a cone arranged axially above the turntable, the cone including a sliding portion arranged to make axial sliding movement with respect to the shaft and a disk holding portion having an annular disk holding surface inclined radially outwards and axially downwards;

an annular yoke arranged above the sliding portion of the cone and fixed to the shaft; and a clamp magnet fixed to the yoke through an adhesive agent;

wherein the yoke includes an upper surface having an annular recess defined in a concentric relationship with the central axis, at least a part of the adhesive agent being applied on a region of the upper surface existing radially inwards of the recess; the recess includes a radial outer wall parallel to the central axis or inclined radially outwards and axially upwards, and a radial inner wall inclined radially inwards and axially upwards; and the angle between the radial outer wall and the central axis is smaller than the angle between the radial inner wall and the central axis, wherein the a rotor unit includes a rotor magnet arranged to rotate about the central axis together with the shaft, the chucking device being attached to the rotor unit; and wherein the stator unit includes a stator arranged to generate magnetic fields toward the rotor magnet, wherein the optical pickup mechanism includes a recording and reproducing unit arranged to perform at least one of optical recording and reproducing tasks with respect to the disk; and wherein the moving mechanism is arranged to move the optical pickup mechanism in a radial direction of the disk.

17. A brushless motor comprising: a chucking device, a rotor unit, and a stator unit, wherein the chucking device for removably holding a disk with a central opening comprises:

a shaft coaxially arranged with a specified central axis;

a turntable fixed to the shaft, the turntable including a disk support surface arranged to support the disk;

a cone arranged axially above the turntable, the cone including a sliding portion arranged to make vertical sliding movement with respect to the shaft and a disk holding portion having an annular disk holding surface inclined radially outwards and axially downwards;

an annular yoke arranged above the sliding portion of the cone and fixed to the shaft; and a clamp magnet fixed to the yoke through an adhesive agent;

wherein the yoke includes an upper surface having an annular recess defined in a concentric relationship with the central axis, at least a part of the adhesive agent being applied on a region of the upper surface existing radially inwards of the recess; the recess includes a radial outer wall parallel to the central axis or inclined radially outwards and axially upwards, and a radial inner wall inclined radially inwards and axially upwards; and the angle between the radial outer wall and a lower surface of the clamp magnet is greater than the angle between the radial inner wall and the lower surface of the clamp magnet, wherein the rotor unit includes a rotor magnet arranged to rotate about the central axis together with the shaft, the chucking device being attached to the rotor unit; and wherein the stator unit includes a stator arranged to generate magnetic fields toward the rotor magnet.

18. A disk drive apparatus, comprising: a brushless motor arranged to rotate a disk; an optical pickup mechanism, and a moving mechanism;

wherein the brushless motor comprising: the chucking device, a rotor unit, and a stator unit, wherein the chucking device for removably holding a disk with a central opening comprises:

a shaft coaxially arranged with a specified central axis;

a turntable fixed to the shaft, the turntable including a disk support surface arranged to support the disk;

a cone arranged axially above the turntable, the cone including a sliding portion arranged to make vertical sliding movement with respect to the shaft and a disk holding portion having an annular disk holding surface inclined radially outwards and axially downwards;

an annular yoke arranged above the sliding portion of the cone and fixed to the shaft; and a clamp magnet fixed to the yoke through an adhesive agent;

wherein the yoke includes an upper surface having an annular recess defined in a concentric relationship with the central axis, at least a part of the adhesive agent being applied on a region of the upper surface existing radially inwards of the recess; the recess includes a radial outer wall parallel to the central axis or inclined radially outwards and axially upwards, and a radial inner wall inclined radially inwards and axially upwards; and the angle between the radial outer wall and a lower surface of the clamp magnet is greater than the angle between the radial inner wall and the lower surface of the clamp magnet, wherein the rotor unit includes a rotor magnet arranged to rotate about the central axis together with the shaft, the chucking device being attached to the rotor unit; and wherein the stator unit includes a stator arranged to generate magnetic fields toward the rotor magnet, wherein the optical pickup mechanism includes a recording and reproducing unit arranged to perform at least one of optical recording and reproducing tasks with respect to the disk; and wherein the moving mechanism is arranged to move the optical pickup mechanism in a radial direction of the disk.

* * * * *